United States Patent

[11] 3,602,902

[72] Inventor Joseph J. Madden
Deerfield, Ill.
[21] Appl. No. 875,823
[22] Filed Nov. 12, 1969
[45] Patented Aug. 31, 1971
[73] Assignee Kelso-Burnett Electric Co.
Chicago, Ill.

[54] DATA HANDLING SYSTEM
21 Claims, 14 Drawing Figs.

[52] U.S. Cl. .......... 340/172.5, 235/92
[51] Int. Cl. .......... G06k 11/00
[50] Field of Search .......... 340/172.5, 146.3; 346/25, 31; 178/18; 235/92

[56] References Cited

UNITED STATES PATENTS

| | | | |
|---|---|---|---|
| 3,342,979 | 9/1967 | Wright et al. | 235/92 |
| 3,391,392 | 7/1968 | Doyle | 340/172.5 |
| 3,393,299 | 7/1968 | Baker | 235/92 |
| 3,412,238 | 11/1968 | Lineback | 235/92 |
| 3,422,419 | 1/1969 | Mathews | 340/172.5 X |
| 3,487,202 | 12/1969 | Sass | 340/146.3 X |
| 3,500,323 | 3/1970 | Funk et al. | 340/146.3 |
| 3,501,623 | 3/1970 | Robinson | 340/146.3 X |

*Primary Examiner*—Gareth D. Shaw
*Assistant Examiner*—Ronald F. Chapuran
*Attorney*—Mason, Kolehmainen, Rathburn and Wyss

ABSTRACT: A system for collecting data from engineering or architectural drawings to prepare estimates includes an output tape punch which records material descriptions and quantities in conjunction with job identifications. The material descriptions are supplied by manually actuated selecting keys which provide code marking to an output steering circuit coupled to the tape punch. Certain of the selectors control a chart drive which selectively positions a group of legend bearing loops to supply proper descriptive legends adjacent others of the selectors to assist the operator. Material quantities are supplied by detectors which are movable relative to the drawings and which are selectively enabled by the material selections. The system includes a scale selector to provide a proper detector input for drawings of different scale. A manual keyboard can also enter quantities and other information. The quantity information is accumulated in a storage register and transferred to the recorder through the output steering circuit. The value in the storage register can be increased or decreased by either the keyboard or the detectors and transferred to the recorder as positive or negative values.

Inventor:
Joseph J. Madden
By:
Mason, Kolehmainen, Rathburn & Wyss
Attys.

PATENTED AUG 31 1971 3,602,902

SHEET 02 OF 11

Inventor:
Joseph J. Madden
By: Mason, Kolehmainen, Rathburn & Wyss
Attys.

Inventor:
Joseph J. Madden
By: Mason, Kolehmainen, Rathburn & Wyss
Att'ys.

Inventor:
Joseph J. Madden
By: Mason, Kolehmainen, Rathburn & Wyss
Attys.

Inventor:
Joseph J. Madden
By:
Mason, Kolehmainen, Rathburn & Wyss
Attys.

Inventor:
Joseph J. Madden
By: Mason, Kolehmainen, Rathburn & Wyss
Attys.

Inventor
Joseph J. Madden
By: Mason, Kolehmainen, Rathburn & Wyss
Attys.

Inventor:
Joseph J. Madden
By: Mason, Kolehmainen, Rathburn & Wyss
Attys.

Inventor:
Joseph J. Madden
By: Mason, Kolehmainen, Rathburn & Wyss
Attys.

Inventor:
Joseph J. Madden
By: Mason, Kolehmainen, Rathburn & Wyss
Attys.

Inventor:
Joseph J. Madden
By Mason, Kolehmainen, Rathburn & Wyss
Attys.

DATA HANDLING SYSTEM

This invention relates to a data handling system and, more particularly, to a system for compiling and recording or storing in machine language data derived from or related to graphic records.

A problem frequently encountered in attempting to extend and obtain the maximum use of data processing equipment is that of collecting source information and placing it in a form in which it can be supplied to the data processing system. It is present, for example, in collecting data in retail stores at the point of sale. It is also presented in a rather specialized form when data processing equipment is to be used in estimating or collecting the data used for establishing the amount to be bid for various types of construction. Accuracy is essential because the bidder may become contractually bound to perform at his bid price, and maintaining a high degree of accuracy is difficult not only because of the many different items and factors that must be considered but also because much of the necessary input data must be derived from a visual study of graphic records such as engineering drawing. Accordingly, the data to be compiled includes not only data derived from records, such as an identification of jobs, areas, and materials, but also quantities of the material.

In the past, apparatus or systems have been developed for compiling and storing or recording this information in a form in which it may be used as a data processor input. However, these systems suffer from the disadvantage that frequently much of the identifying data must be looked up in specification or code books and manually entered through a keyboard. In addition, these systems frequently lack sufficient internal programming to insure correlation between entries relating to areas in different jobs. Further, these prior systems are not flexible enough in use while insuring the integrity of the data entries. An object of the present invention is to provide a new and improved data handling or estimating apparatus that overcomes or reduces these deficiencies.

Many other objects and advantages of the present invention will become apparent from considering the following detailed description in conjunction with the drawings in which.

Figure 7:
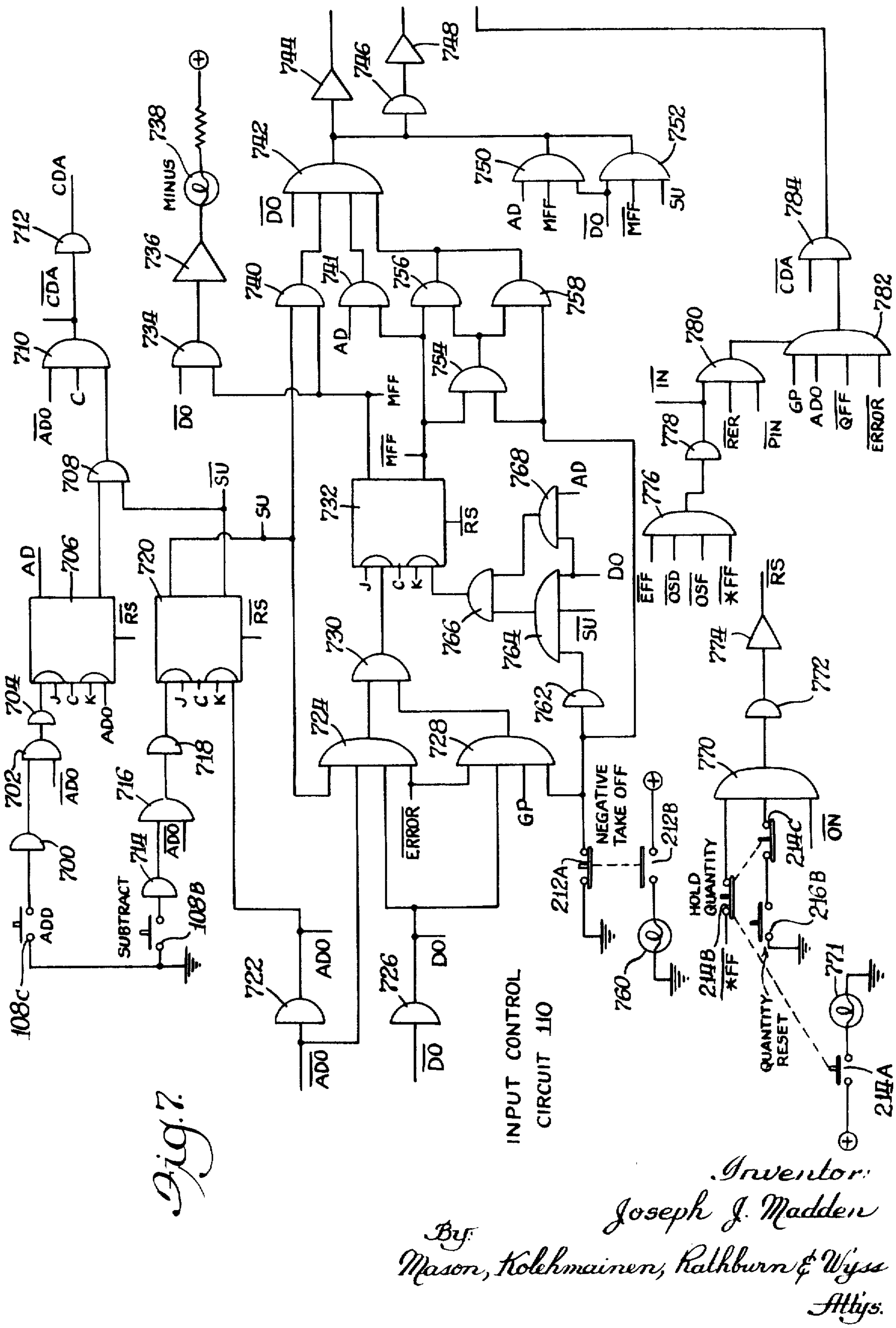
Figure 8:
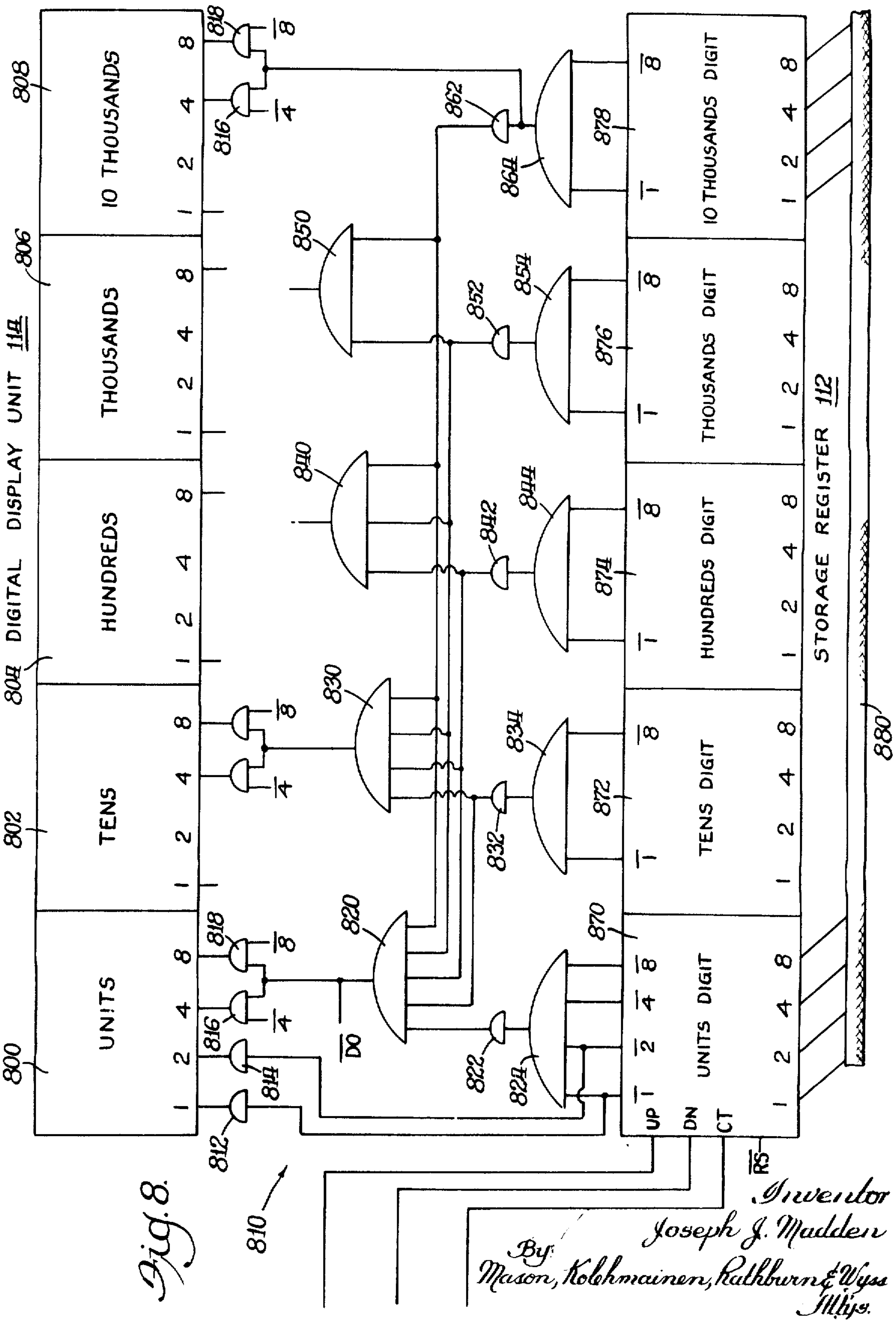
Figure 9:
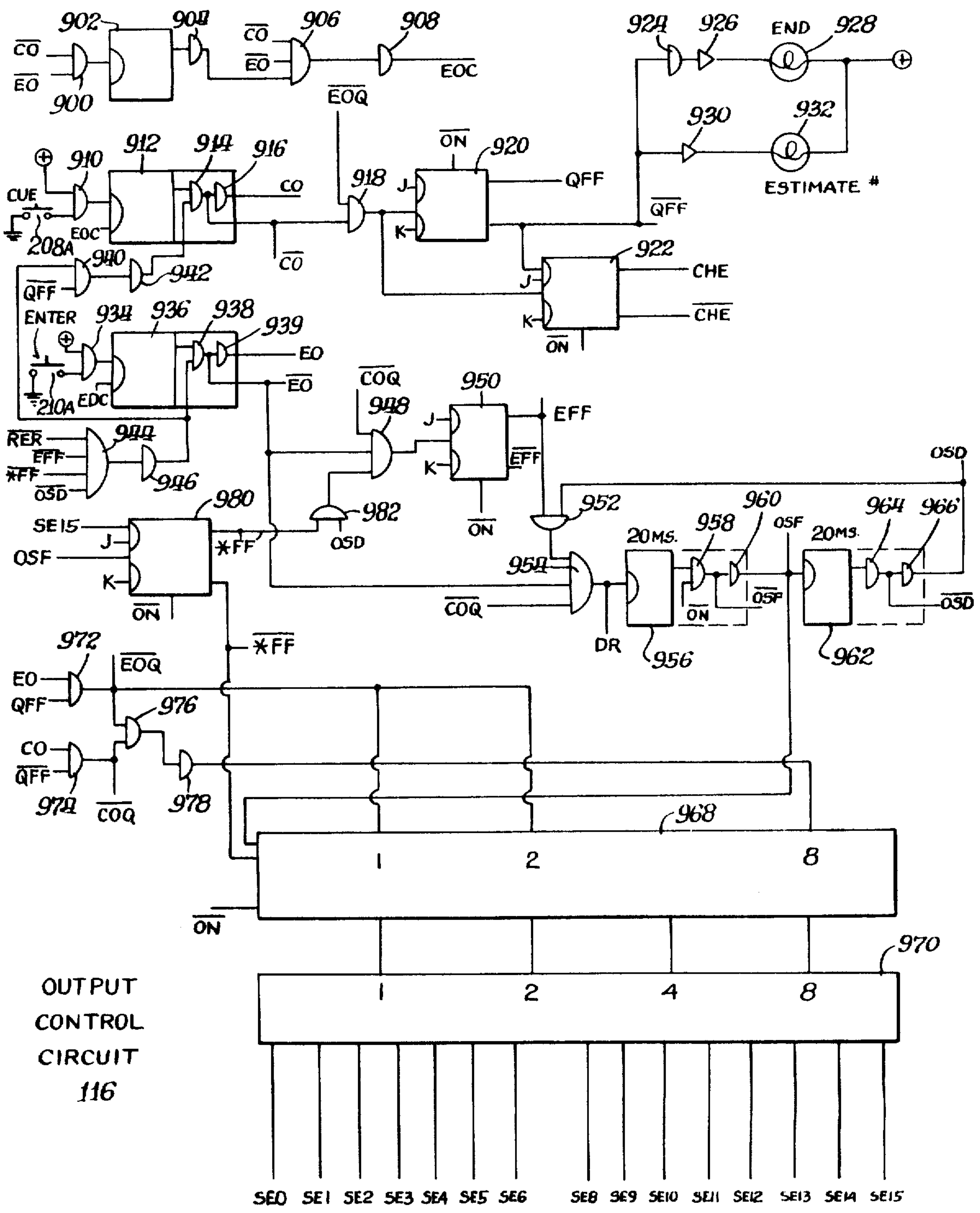
Figure 10:
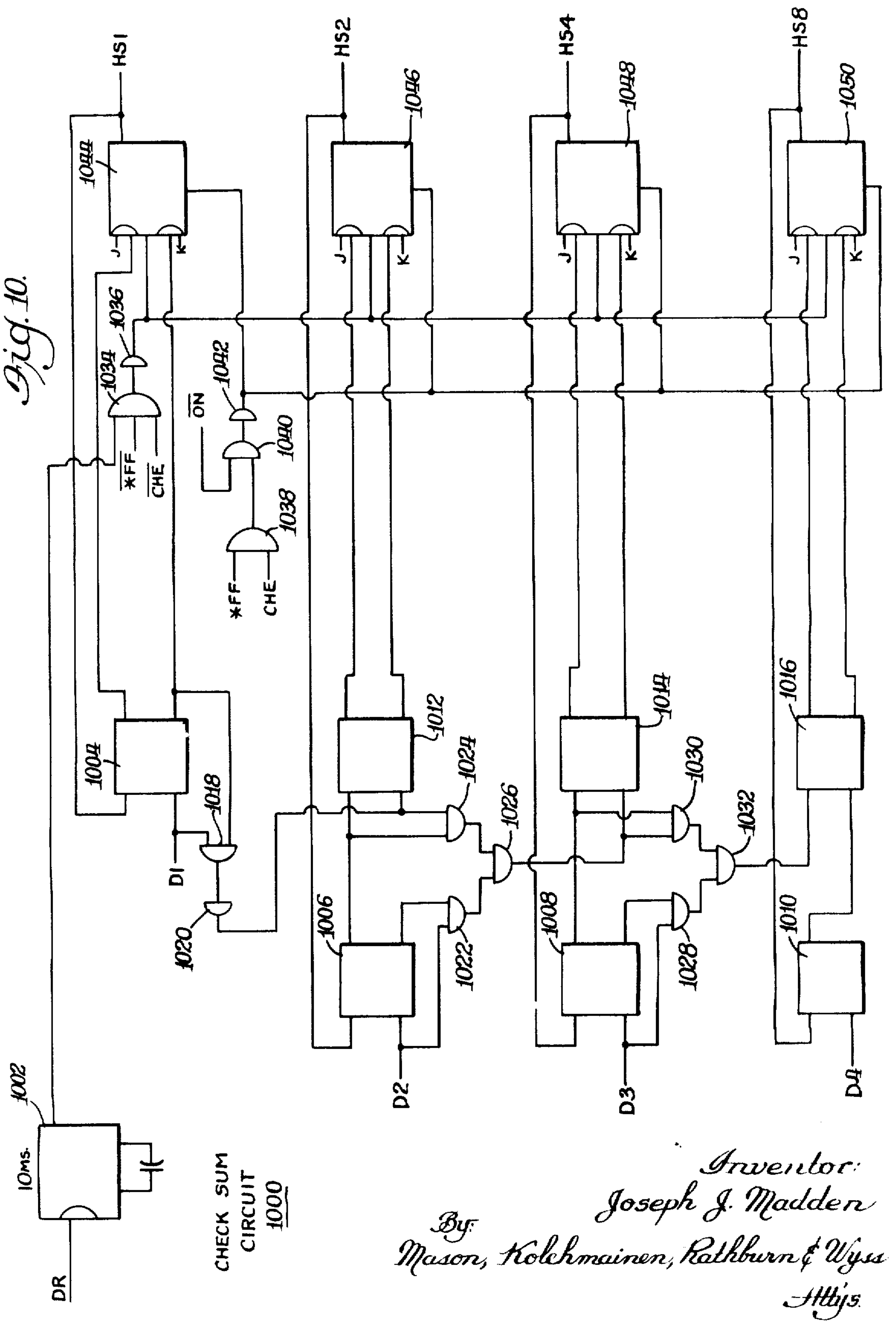
Figure 11:
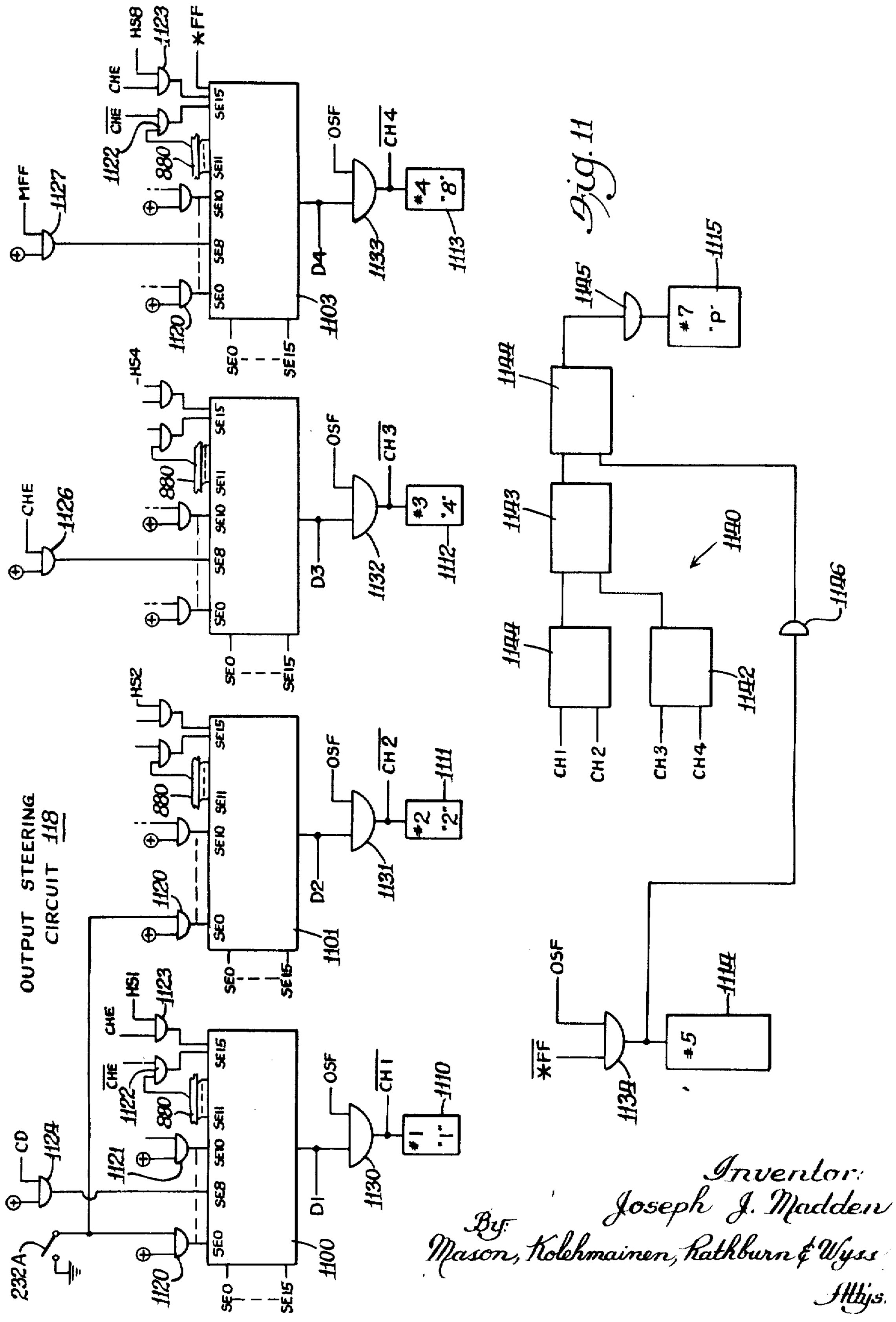
Figure 12:
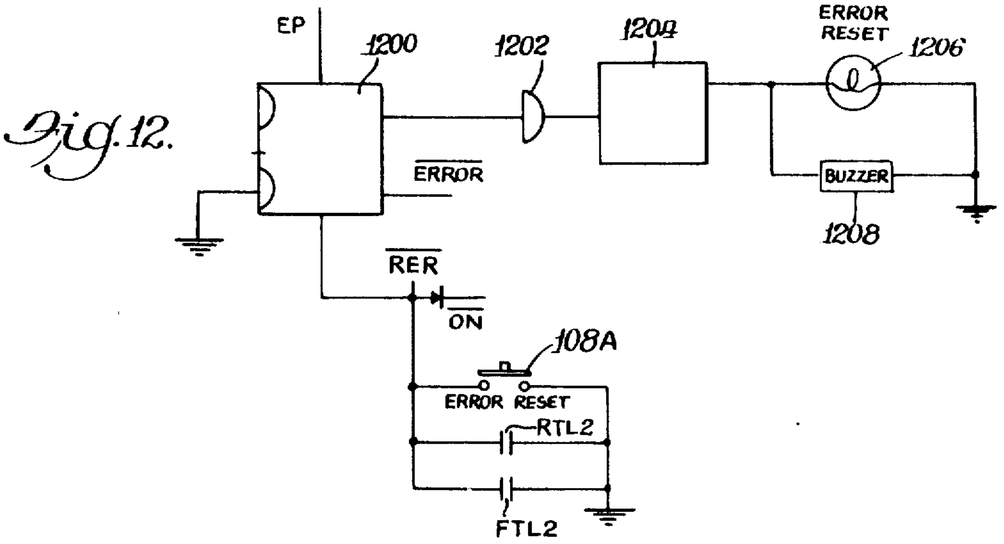
Figure 13:
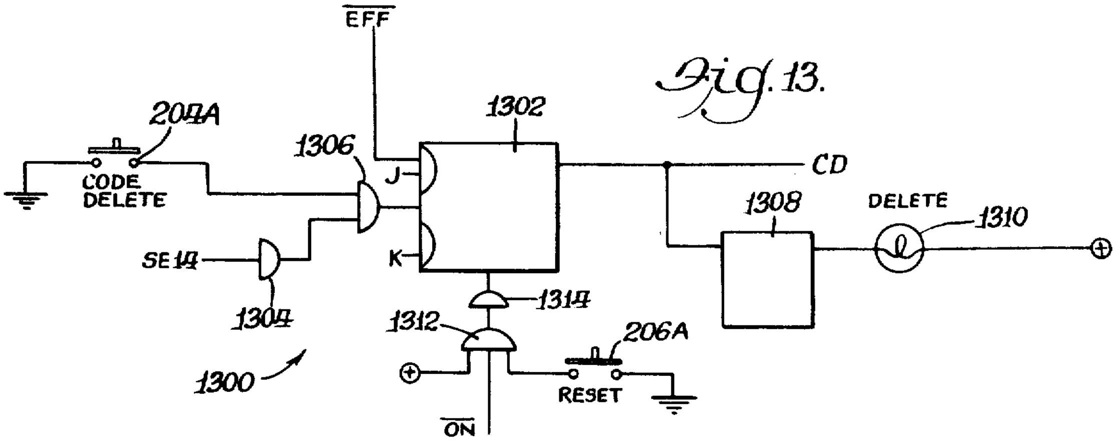

FIGS. 7 and 8, when placed side-by-side in their elongated direction, form a schematic circuit diagram of an input control circuit and an input storage register;

FIG. 9 is a circuit diagram of an output control circuit;

FIG. 10 is a circuit diagram of a checksum circuit;

FIG. 11 is a circuit diagram of an output steering circuit for transferring data to a recorder;

FIG. 12 is a circuit diagram of an error reset control circuit;

FIG. 13 is a circuit diagram of a code delete control circuit; and

Figure 14:
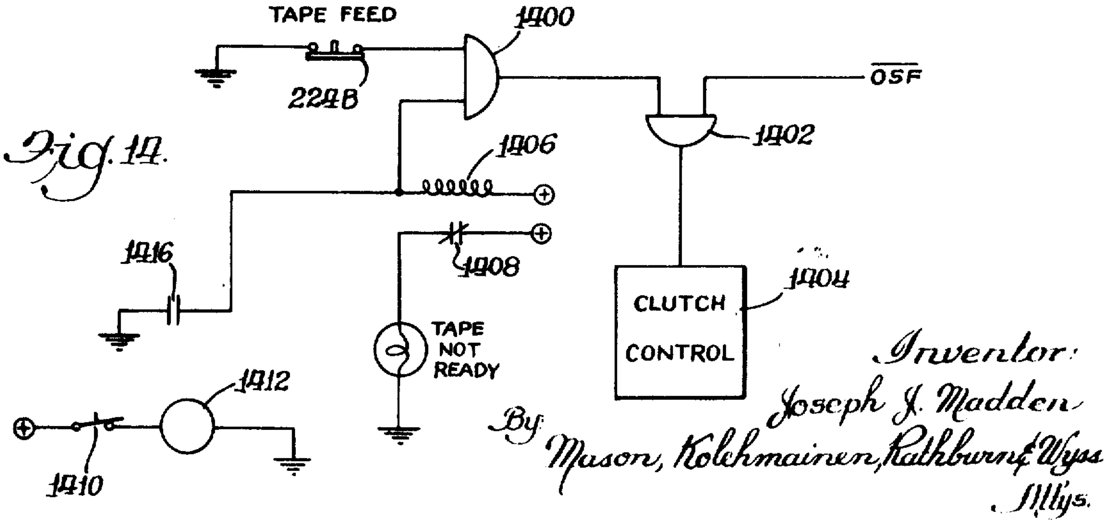

FIG. 14 is a circuit diagram of a tape feed control circuit.

Figure 1:
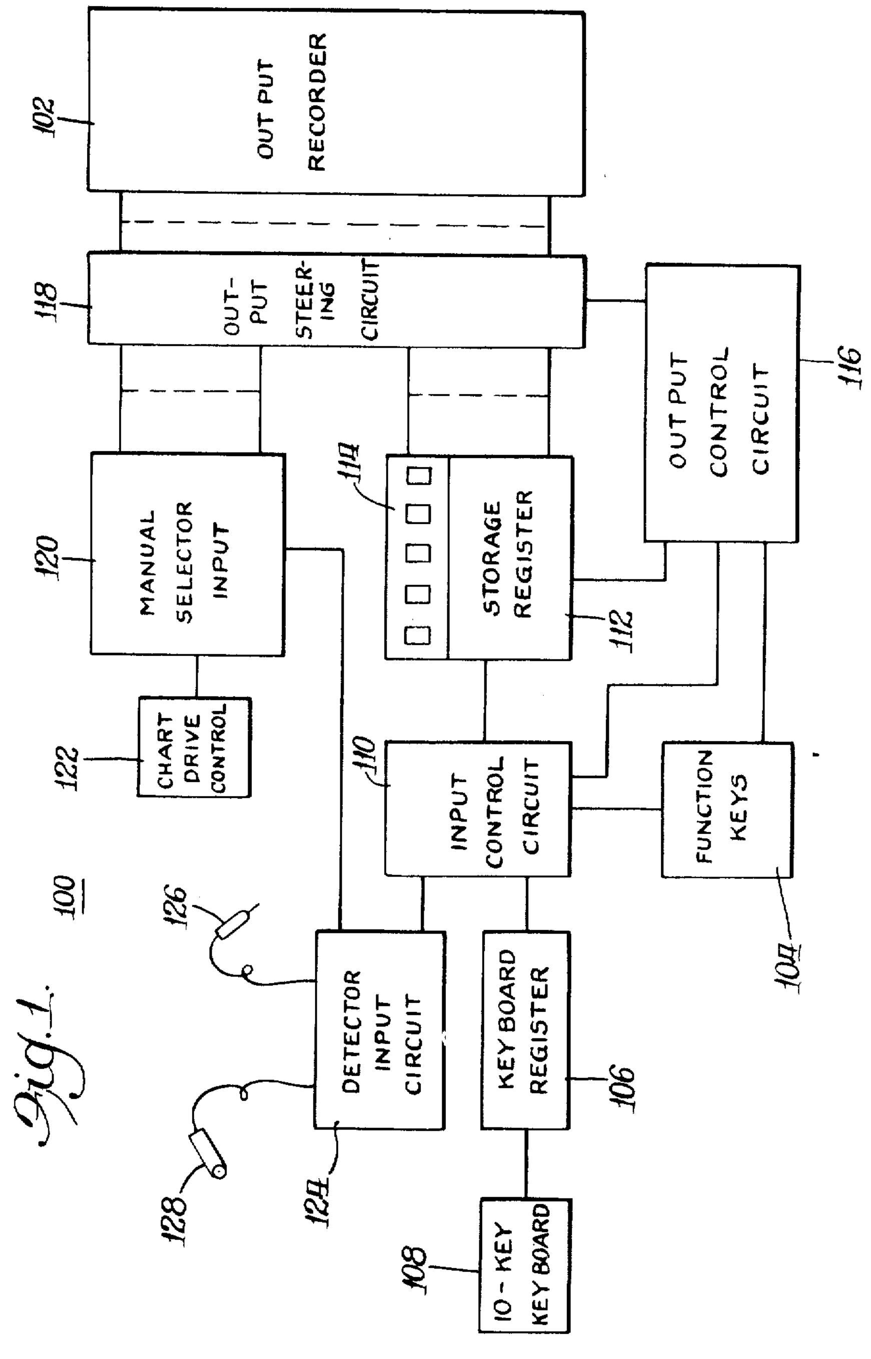
FIG. 1 is a block diagram of a data compiling and recording system embodying the present invention.

Referring now more specifically to FIG. 1 of the drawings, therein is illustrated a data compiling and recording system which is indicated generally as 100 and which embodies the invention. The system 100 automatically collects and stores in machine language all of the data necessary to provide source information for establishing in a remote central processing unit the price to be bid, for instance, for an electrical contracting job. The system is so arranged that data cannot be entered into the system without insuring the provision of adequate data in storage identifying not only the job, but the nature of the material or operation to which entered quantities relate. The data can be manually entered as through a keyboard or automatically entered using external sensors or detectors movable relative to such graphic originals as engineering drawings. The record produced by the system is capable of supplying all of the necessary source information so that in conjunction with a program an estimate including material lists and labor costs can be developed without manual intervention.

To carry this out, the system 100 includes an output recorder 102 such as a magnetic recorder, or in the illustrated embodiment a tape perforator. The format or program of the system 100 is such that the first item of information supplied to the recorder 102 is a digital designation identifying the job or estimate, and the necessity of first entering this item of information is visually displayed by backlighting or illuminating one of a group of function keys 104. The operator keys a five-digit number into a keyboard register 106 identifying the estimate using a 10-key keyboard 108 and then actuates an add key in the group of function keys 104 to transfer the five-digit entry from the keyboard register 106 under the control of an input control circuit 110 to a storage register 112. A visual display 114 controlled by the storage register 112 provides a visual display of the estimate identifying number. The operator then actuates an enter key in the group of function keys 104 which controls an output control circuit 116 to prime an output steering circuit 118 to a position for a short data sweep which is then initiated to transfer the five digits of the estimate from the storage register 112 to the output recorder 102, incident to which the storage register 112 is cleared. This entry also changes the selective illumination of the function keys so that the illuminated legend indicating the necessity for entering an estimate number is removed, and a lamp on a cue switch is illuminated indicating that the depression of this key will automatically enter an end of data block message. The entry of the estimate or job identification into the output recorder 102 also frees the system 100 for normal data entry.

Figure 2:
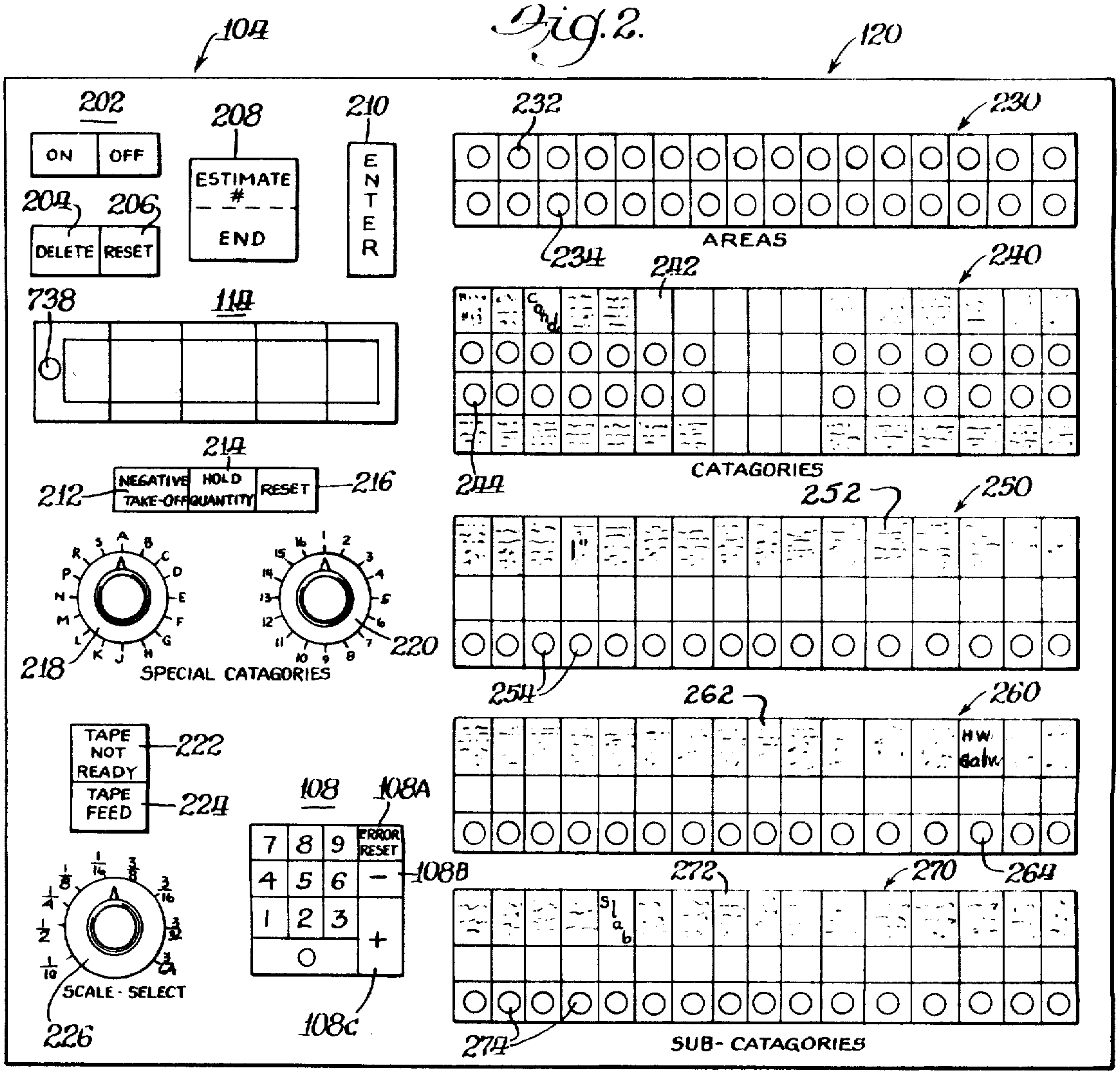
FIG. 2 is a plan view of an input console for the estimating system or apparatus.

The operator then selectively operates a group of selectors or keys comprising a manual selector input 120 (FIGS. 1 and 2). A first bank of keys 230 (FIG. 2) includes two rows of 16 keys 232, 234 providing a two-digit designation for the area or location or type of construction involved. These keys remain locked when operated to provide marking conditions which are encoded into machine code and thus store the coded entry of the area. The operator then actuates one of a number of keys 244 in a bank 240 with which are associated permanent indicia in corresponding windows 242 representing a type or category of material that he desires to enter next into the system 100. As an example, the operator could depress a key 244 associated with a legend "COND" indicating conduit as the type of material to which the following information relates. The actuation of the key 244 is effective to set up coded marking conditions in the manual selector input circuit 120 representing this selection.

In addition, the actuation of one of the keys 244 in the categories bank 240 controls a chart drive 122 (FIG. 1) so that three charts are placed in motion and moved to positions relative to three subcategory banks 250, 260, and 270 (FIG. 2) so that data or legends relating to conduit are exposed in three sets of windows 252, 262, and 272, The operator thereupon manually depresses a key 254, 264, and 274 in each of the banks 250, 260, and 270 in accordance with a further specification or definition of the material. As an example, if conduit is the general category of material, the operator can actuate a key 254 associated with the legend "1''" to specify that the data relates to 1-inch conduit, can depress a key 264 associated with the legend "HW Galv" indicating that the conduit is heavy wall and galvanized. In the bank 270 a key 274 associated with the legend "Slab" can be actuated indicating that the conduit is to be installed in slab. The actuated keys 254, 264, and 274 also establish marking conditions in the machine code. Thus, by the selective actuation of one of the keys in the category bank 240, legends of the banks 250, 260, and 270 related to the selected category are moved to exposed position to permit the selection of material further describing the size, material, and the method of installation, all of which is presented in coded form at the output of the manual selector input 120.

The operator can then enter the desired quantity of this material using either the keyboard 108 and the keyboard register 106 or a detector input circuit 124, to the input of which are coupled a pair of detectors or sensors including an item counting probe 126 and a running length or footage detector 128. When the keyboard 108 is used as a means for entering, for example, the required number of feet of conduit, the direct digital entry is transferred from the keyboard register through the input control circuit 110 to the storage register 112 under the control of the add key in the keyboard 108. Alternatively, the footage detector 128 can be placed on the engineering drawing and moved along the conduit runs to control the detector input circuit 124 to supply an input through the input control circuit 110 affording direct entry to the storage register 112. When using the detector 128, a scale selecting switch 226 (FIG. 2) in the detector input circuit 124 (FIG. 1) is set to the scale of the engineering drawing or blueprint to provide a proper input for the storage register 112. The item probe 126 advances the quantity stored in the storage register 112 a single count after actuation and is used, for example, in counting items on a drawing such as switches or lighting fixtures. In the conduit category the probe 126 could be used to count the termination or bends. The 10-key keyboard 108 and the detector 128 can be used in conjunction with the add and subtract keys in the keyboard 108 and a negative takeoff key 212 in the function keys 104 to add or subtract a quantity of, for example, conduit stored in the storage register 112 and displayed in digital form on the display device 114.

Since some categories relate to items that are not measured in footage and so as to prevent improper entries or attempts to enter information using the detector 128, the manual selector input 120 supplies an inhibiting signal to the detector input circuit 124 to prevent the transfer of an input from the detector 128 to the storage register 112 when these categories have been selected. Similarly, the manual selector input 120 selectively inhibits the use of the item detector 126 in dependence on the nature of the selected category.

If certain selected categories cannot be adequately defined using the three banks 250, 260, and 270, the manual selector inputs 120 include two additional special category switches 218 and 220 (FIG. 2) which can be adjusted to provide additional or supplementary identifying or designating information on the record. The switches 218 and 220 establish marking conditions in the manual selector input 120 in dependence on their setting.

When the operator is sufficiently satisfied that the "takeoff" for the selected material is complete, the enter key 210 (FIG. 2) in the function keys 104 (FIG. 1) is actuated. This places the output control circuit 116 in operation to operate the output steering circuit 118 through a full scan in which the items of information set up by the operated keys in the manual selector input circuit 120 and the quantity data stored in the storage register 112 are transferred to and recorded by the output recorder 102. Incident to this operation, the storage register 112 is again cleared.

The operator may now change selected subcategories within the selected category or can change categories completely to effect operation of the chart drive 122 so that new legends or identifying information are moved into display positions in the windows 252, 262, and 272 associated with the subcategory selecting banks 250, 260, and 270. Thereafter by using the keyboard 108 and the detectors 126 and 128 additional information is entered into the storage register 112 and subsequently transferred to the output recorder 102 using the function keys 104.

When all of the data to be gathered at this time has been entered on the record tape by the output recorder 102, the operator actuates the cue switch 208 (FIG. 2) and which is now illuminated to indicate "END" or "END OF ESTIMATE." The actuation of this key in the function keys 104 controls the output control circuit 116 to operate the output steering circuit 118 through a scan during which a predetermined code identifying the end of the block of information is recorded by the output recorder 102. This end of block or end of tape entry includes in one of the character positions a checksum character which is used to check the integrity of the collecting system. The operation of the cue key 208 in the function keys 104 also controls the input control circuit 110 to inhibit further inputs to the storage register 112 under the control of the detector input circuit 124 until an estimate identifying number is again entered through the keyboard 108 and switches the illumination of the cut key 208 for the "END" designation to the "ESTIMATE 0."

In this manner the system 100 places in reproducible form on the tape of the output recorder 102 in machine language all of the necessary input data as well as the control data required by the central processing unit. The system 100 through its internal program insures the accurate definition and description of the entered data, insures its entry in the proper sequence, and inhibits attempts to enter improper data through the detectors 126 and 128. In addition, this identifying data is made available without resort to code or specification books through the use of the manual selector input circuit 120.

Entering Estimate Number

As set forth above, the system 100 is so arranged that data cannot be entered into this system unless an estimate number or other identifying designation is entered as the first item of information into the output recorder 102. As set forth above, the cue switch or key 208 is illuminated to display "ESTIMATE 0" (FIG. 2) to advise the operator of the fact that the estimate number must now be entered. The estimate number is now keyed into the system 100 using the keyboard 108 and transferred from the keyboard register 106 through the input control circuit 110 to the storage register 112 by using the add key on the keyboard unit 108. This estimate number is displayed in the visual display unit 114 to insure that it has been correctly entered. Thereafter the operator actuates the enter key 210 to transfer the estimate number from the storage register 112 to the output recorder 102 through the output steering circuit 118 under the control of the output control circuit 116. In this operation the output steering circuit 118 operates through a short scan since only a limited quantity of data is being supplied. In response to the entry of the estimate number, the cue switch 208 is illuminated so that the legend "END" is illuminated and removes an inhibit from the system 100 to permit the entry of data through a detector input circuit 124.

Referring now more specifically to the detailed operation of the system 100, when the system or apparatus 100 is to be placed in operation, an on-off switch 202 (FIG. 2) is operated to supply power to the unit. The power supply circuits and the controls therefor can be of any suitable and well-known type. This control circuit includes a relay having a pair of normally closed contacts 693 (FIG. 6) which is slow to operate, and the contacts 693 are opened after a period of time sufficient to supply operating potential to the system. Thus, the contacts 693 provide a short duration, low level or inverted reset signal $\overline{ON}$. This signal is used to reset components of the system 100 to their normal condition. The inverted signal $\overline{ON}$ is also supplied to one input on a NAND gate 694 whose output is coupled through an inverted 695 to the input of an amplifier 696. Thus, the inverted signal $\overline{ON}$ also provides an inverted reset signal $\overline{RSI}$ for use in the detector input circuit 124. These reset signals which are automatically provided on supplying power to the system 100 restore the system to a normal state for receiving the first input information.

More specifically, the inverted reset signal $\overline{ON}$ is applied to a prime terminal of a flip-flop 920 (FIG. 9) to set this flip-flop so that an output signal OFF becomes more positive and the inverted output signal $\overline{OFF}$ drops to a more negative potential. This potential is applied to the input of a lamp driving amplifier 930 and renders this amplifier effective to illuminate a lamp 932. The illuminated lamp 932 lights the upper half of the key 208 (FIG. 2) to provide the "ESTIMATE 0." This advises the operator that an estimate number must be entered into the system 100 before additional data can be entered. The low level signal OFF is inverted in a gate 924 (FIG. 9) to inhibit a lamp amplifier 926 and prevent the illumination of the connected lamp 928 which illuminates the lower half of the key 208 (FIG. 2) to provide the legend "END."

The more negative output signal $\overline{OFF}$ from the flip-flop 920 is applied to one input of a NAND gate 782 (FIG. 7) to inhibit this gate. The inhibiting of the gate 782 prevents the transfer of data from the detector input circuit 124 through the input control circuit 110 to the storage register 112. Thus, the data can be stored in the register 112 only under the control of the keyboard 108. The signal $\overline{OFF}$ is also applied to one input of a gate 940 (FIG. 9) to inhibit this gate and another gate 914 through an inverter 942. The gate 914 is connected to the output of a monostable circuit 912 controlled by the cue switch 208. Thus, this prevents any attempt to enter data through actuation of the cue switch 208.

The operator now keys up to a five-digit numerical designation identifying the estimate number into the keyboard register 106 using the keyboard 108. The keyboard register 106 (FIG. 5) includes five stages or individual digit storing elements 540, 550, 560, 570, and 580 of a suitable well known construction. The storage elements 540, 550, 560, 570 and 580 are connected in parallel so that when strobe or shift pulses are received on a shift pulse line 521, an entry from the keyboard 108 is shifted into the input stage 540, and any entries in these stages are shifted one stage to the right. In other words, successive entries from the keyboard 108 are shifted in parallel from the input stage 540 to the last stage 580 in response to successive shift pulses on the line 521. The five stages 540, 550, 560, 570, and 580 are connected in series in the output mode, as indicated by a series of conductors 541, 551, 561, and 571 so that when successive count pulses or signals CDA are applied to the input of the stage 540, the values standing in the register 106 are decremented toward a zero setting.

The five stages 540, 550, 560, 570, and 580 of the keyboard register 106 are reset to a normal or zero setting by an inverted reset signal $\overline{RER}$. This signal is developed by circuit shown in FIG. 12 at various times during the operation of the system. As an example, when the system 100 is placed in operation to develop the inverted resetting signal $\overline{ON}$, this signal is forwarded from FIG. 12 as the inverted signal $\overline{RER}$ to reset the keyboard register 106 to its normal setting.

When the operator makes the first digital entry of the designation identifying the estimate number, the keyboard unit 108 (FIG. 5) provides positive-going signals representing the entered decimal digit in binary coding on a combination of output leads representing the binary weights "1," "2," "4," and "8." These signals are applied in their true or inverted form to the input of the first stage 540 through a combination of NAND gates and inverters 500, 592, 506, 522, 524, 528, 530, 532, and 534. The output signals from the keyboard 108 are all 2 of 4 coded except for the decimal digit "7" which appears at the output of the keyboard 108 as the binary weights "4" and "8." Accordingly, when this code is presented, a NAND gate 504 is fully enabled so that its more negative output is effective through the gates 522 and 524 to provide true markings to the "1" and "2" inputs of the first stage 540. The more positive true output representing the binary weight "4" from the keyboard 108 is directly applied to the corresponding input of the first stage 540. The more negative output from the fully enabled gate 504 is effective through the gate 506 and the inverter 528 to provide a false or inverted input to the "8" weight input to the first stage 540. Thus, the decimal digit "7" represented in the output from the keyboard 108 as "4" and "8" is supplied to the input of the stage 540 as the binary weights "1," "2," and "4."

The appearance of an output from the keyboard unit 108 generates the strobe or shift signal supplied to the line 521 for reading the entry into the input stage 540 and for shifting previously entered entries to subsequent stages of the register 106. More specifically, the outputs of the inverters 500 and 502, the output of the gate 506, and the output of an inverter 526 whose input is connected to the "4" terminal of the keyboard 108 are all connected to the input of a NAND gate 512. The expander input of this gate which is not a gate function is coupled to the "0" output of the keyboard 108 through two inverters 508 and 510. Accordingly, whenever the zero key of the keyboard 108 or any other key is actuated, the gate 512 is effective through an inverter 514 to provide a more negative signal to the input of a monostable timing circuit 516. This actuates the circuit 516 to supply a positive signal on the duration of around 18 milliseconds to one input of a NAND gate 518, the other input of which is normally supplied with an enabling signal $\overline{IN}$. The more negative output from the gate 518 is forwarded through an inverter 520 to provide a positive-going shift pulse on the shift bus or conductor 521. The leading edge of this pulse controls the stages 540, 550, 560, 570, and 580 to read the input signals, and the trailing edge of this pulse transfers the setting. Accordingly, at the end of the shift pulse provided by the monostable circuit 516, the first entry supplied by the keyboard 108 is stored in the first or input stage 540 to the keyboard register 106. During succeeding key actuations, subsequent digital entries are supplied to the input stage 540, and these entries are shifted in sequence through the remaining stages 550, 560, 570, and 580 of the keyboard register 106.

To provide an indication that data is stored in the keyboard register 106, four NAND gates 552, 562, 572, and 582 coupled to the extender input of a NAND gate 542 provide an OR function to supply a more negative signal $\overline{ADO}$ whenever a single bit is stored in any of the stages 540, 550, 560, 570, and 580 of the keyboard register 106. The inputs to the gates 542, 552, 562, 572, and 582 are thus connected to the false or inverted outputs of these stages. Thus, when a single bit of information is stored in any of the stages of the keyboard register 106, the inverted signal $\overline{ADO}$ is more positive. On the other hand, when the keyboard register 106 does not contain an information bit, all of the inputs to the gates 542, 552, 562, 572, and 582 are at a more positive potential, and the inverted signal $\overline{ADO}$ becomes more negative.

In the event that any errors are made in entering digits into the keyboard register 106 from the keyboard 108, the error reset key 108A in the keyboard 108 (FIG. 2) can be operated to close a corresponding designated set of contacts (FIG. 12) to generate the reset signal $\overline{RER}$. This signal is set forth above is supplied to all of the stages of the keyboard register 106 to clear these registers to a normal condition following which the estimate number can be again entered into the keyboard register 106 using the keyboard 108.

The estimate number now stored in the keyboard register 106 is transferred to and stored in the storage register 112 under the control of the input control circuit 110. The storage register 112 (FIG. 8) can comprise any one of a number of known up-down counters and includes five sections or stages, 870, 872, 874, 876, and 878 in which are stored, respectively, the values of the units, tens, hundreds, thousands, and ten thousands digits in binary coded form. When an enabling signal is applied to an up terminal UP, successive signals supplied to a count terminal CT advances the setting of the register 112 in an up or forward direction. Conversely, when an enabling signal is applied to a down terminal DN, successive pulses supplied to the count terminal CT operate the storage register 112 in a reverse direction or reduce the value standing therein. When an inverted reset signal $\overline{RS}$ is applied to the storage register 112, the stages 870, 872, 874, 876, 878 of the storage register 112 are all reset to a normal condition in which low level signals are applied to the true binary weighted output terminals. These terminals are connected to the output steering circuit 118 over a cable 880. In this normal or reset condition, the inverted output signals are all at a more positive level.

The inverted output signals from the stages of the storage register are used to control the operation of the digital display unit 114 through a leading zero suppression circuit 810. The digital display unit 114 includes five digital display means 800, 802, 804, 806, and legends which provide visual decimal digit displays representing the values of the units, tens, hundreds, thousands, and ten thousands digits of the quantity stored in the register 112 in accordance with binary coded input signals. The digital display means can be of any suitable well known construction. Each of the units 800, 802, 804, 806, and 808 include decoders which are presented binary weighted input signals and provide a visual display of the corresponding decimal digit. The decoders in each of these display means translate an input code consisting of binary weights "4" and "8" as a blank signal and does not provide a visual display. An absence of input signals represents "0."

The leading zero suppressing circuit 810 interposed between the storage register 112 and the digital display unit 114 makes use of the blanking ability of the units 800, 802, 804, 806, and 808 by generating a "4" and "8" code whenever a zero representing input is provided for any of the display stages, and there is not a more significant digit in the quantity to be displayed. The circuit 810 includes five four-input NAND gates 824, 834, 844, 854, and 864 each coupled to the inverted outputs of one of the storage register stages 870, 872, 874, 876, 878. The outputs of the gates are inverted in individually connected inverters 822, 832, 842, 852, and 862 and applied to the inputs of four NAND gates 820, 830, 840 and 850, each individually associated with the units, tens, hundreds, and thousands display units 800, 802, 804 and 806. Thus, the five-input gate 820 provides a low level output $\overline{DO}$ when the entire storage register 112 has been reset to its normal position and provides a more positive output signal $\overline{DO}$ whenever a bit is stored in any of the five stages 870, 872, 874, 876, and 878. The gate 830 provides similar outputs in dependence on the state of the registers 872, 874, 876, and 878 while the gate 840 provides these outputs in dependence on the data stored in the units 874, 876, and 878. The gate 850 is controlled by the status of the storage units 876 and 878, while the output of the gate 864 provides the same signal in dependence on the state of the ten thousands digit register 878.

In each of the stages 870, 872, 874, 876, and 878, the inverted binary outputs "1" and "2" are connected to the "1" and "2" inputs of the related display means through two inverters such as the inverters 812 and 814. The inverted "4" and "8" inputs are connected to the "4" and "8" inputs of the related display means through a pair of NAND gates such as a pair of NAND gates 816 and 818 associated with the units display means 800. In each of these stages the second enabling input to each of the gates 816 and 818 is controlled by the related one of the NAND gates 820, 830, 840, and 850 with the ten thousands display unit 808 being supplied with enabling potential from the output of the NAND gate 864.

Thus, with regard to the units display means 800, the "1" and "2" inputs are supplied with more positive signals from the inverters 812 and 814 in dependence on the setting of the connected register stage 870. Similarly, the NAND gates 816 and 818 provide more positive inputs to the display means 800 for the binary weights "4" and "8" in dependence on the setting of the register stage 870. However, if there are no significant digits stored in the register stages 872, 874, 876, and 878, and no bits stored in the connected units digits register 872, the gate 820 is fully enabled and the gates 816 and 818 provide more positive signals to both of the "4" and "8" input terminals to the display means 800. This produces a blanking signal in the unit and prevents a visual display. If, on the other hand, there is no data stored in the units digits stage 870 but there is a significant digit stored in one of the stages 872, 874, 876, and 878, the output of the gate 820 is at a more positive potential and the two inverters 812 and 814 and the two gates 816 and 818 all provide low level input signals to the display unit 800 with the result that a "0" is displayed.

The gates 830, 840, 850, and 864 control the provision of displays of digits, a zero, or a blank in dependence on the data stored in the associated and more significant stages 872, 874, 876, and 878 in the manner described above.

Referring now more specifically to the input control circuit 110 (FIG. 7), this circuit is reset to a normal state when the system 100 is placed in operation by the actuation of the on-off switch 202. As set forth above, this generates the inverted signal $\overline{ON}$ which is applied to one input of a NAND gate 770 to drive the output of this gate to a more positive potential. This output signal is forwarded through an inverter 772 and an amplifier 774 to provide a more negative-going pulse or signal $\overline{RS}$ which is coupled to the common reset terminals of three flip-flops 706, 720, and 732 in the input control circuit 110. This signal resets these flip-flops so that their inverted outputs become more positive and their direct outputs become more negative. The reset signal $\overline{RS}$ also resets the five stages 870, 872, 874, 876, and 878 of the storage register 112 to a normal condition so that the output signal $\overline{DO}$ from the gate 820 drops to a lower level to indicate that no data is stored in the storage register 112. This more negative signal is forwarded through an inverter 726 to provide the signal DO and to provide one enabling input to two NAND gates 724 and 728.

Further, when the first bit is stored in the keyboard register 106, the inverted signal $\overline{ADO}$ rises to a more positive potential and is effective through an inverter 722 to provide a more negative signal ADO which is applied to one of the K inputs to the two flip-flops 706 and 720 to inhibit operation of either of these flip-flops to their reset condition under the control of signals applied to the clock input to these flip-flops. In the drawings, the open J and K inputs are cross-connected. The more negative signal ADO also applies an inhibit to the gate 782 so that a more positive potential is applied to one input of a gate 784. The other input to this gate is supplied with an inverted signal $\overline{CDA}$ which is normally maintained at a more positive potential so that a more negative potential is applied to the count terminal of the input stage 870 of the storage register 112. The inverted signal $\overline{CDA}$ is maintained at a more positive potential because the resetting of the two flip-flops 706 and 720 fully enables a NAND gate 708 so that a negative output from the gate is supplied as an input to a gate 710. This drives the output of the gate 710 to a more positive potential to provide a more positive inverted signal $\overline{CDA}$. The signal is forwarded through an inverter 712 to provide a lower level signal CDA.

The circuit remains in this condition until such time as the operator desires to transfer the estimate number now stored in the keyboard register 106 into the storage register 112 and to provide a display thereof in the digital display unit 114. To effect this transfer in an additive or positive sense so that the quantity in the keyboard register 106 is added to the zero quantity now standing in the storage register 112, the operator depresses the plus or add key 108C (FIGS. 2 and 7). The closure of the contacts 108C on this key applies a more negative input to an inverter 700 so that the output of this inverter completes the enabling of a NAND gate 702, the other input of which is supplied with the more positive signal $\overline{ADO}$. The output of the gate 702 is forwarded through an inverter 704 to provide a more positive input to one of the J inputs to the flip-flop 706. The clock input of this flip-flop is continuously supplied with clock pulse signals C from a suitable clock pulse source. The flip-flop 706 reads the input signals during high level of the clock signal and transfers it to the output when the clock drops low. Accordingly, when the clock signal C drops low, the add flip-flop 706 is set to provide a more positive output signal AD and to apply an inhibit to one input of the gate 708. This drives the output of this gate to a more positive potential and enables one input to the gate 710. The second input to this gate is enabled by the inverted signal $\overline{ADO}$ because of the presence of a bit in the keyboard register 106. The third input to this gate is supplied with the clock signal C. Thus, the output of the gate 710 now provides a train of pulses providing the signal CDA and the inverted signal $\overline{CDA}$ at the clock pulse rate. Since the add key is only momentarily depressed to close the contacts 108C, the inverter 704 returns a more negative potential to the connected J input to the flip-flop 706. Since, however, a more negative input is applied to the signal ADO to one of the K inputs, the flip-flop 706 is not reset by subsequent clock pulses.

The input control circuit 110 also selectively supplies an enabling signal to the storage register 112 to determined whether this register is to count in a forward or reverse direction. More specifically, when the storage register 112 is reset to its zero condition, the inverted signal DO drops to a more negative potential and is applied as one input to a NAND gate 742. This provides a more positive output from this gate which is forwarded through an amplifier 744 to the up terminal of the register 112 to condition this register for counting in a positive or incrementing direction. This same output signal from the gate 742 is forwarded through an inverter 746 and an amplifier 748 to provide a more negative signal to the down terminal DN of the register 112 to inhibit counting in a reverse or decrementing direction. Further, when the add flip-flop 706 is set, the signal AD becomes more positive and is applied to one input of a NAND gate 741. The other input to this gate is supplied with a more positive inverted signal $\overline{MFF}$ from the flip-flop 732. Thus, the gate 741 is fully enabled and supplies a more negative potential to the input of the gate 742. This holds the output of the gate 742 at a more positive potential when a single count has been entered into the register 112, and the inverted signal $\overline{DO}$ rises to a more positive potential.

As set forth above, the setting of the add flip-flop 706 enables the clock signal C to control the gate 710 and the inverter 712 to provide the inverted counting signal $\overline{CDA}$ and the counting signal CDA. The counting signal CDA is coupled to the input of the lowest stage of the five serially connected counting stages 540, 550, 560, 570, and 580 of the keyboard register 106. As set forth above, successive input signals CDA to the input of the keyboard register 106 decrements the value stored therein. The inverted counting signal $\overline{CDA}$ is applied from the gate 710 (FIG. 7) to the upper input of the gate 784. The lower input of this gate is held at a more positive potential by the gate 782 because two input signals ADO and $\overline{OFF}$ are held at a more negative potential. Thus, the gate 784 repeats the counting signals $\overline{CDA}$ and applies them to the input counting terminal CT of the storage register 112. Since this register is conditioned for forward counting, the input signals applied to this register increment the value in step with the decrementing of the value standing in the keyboard register 106. When the first incremented value is added to the quantity in the storage register 112, the inverted signal $\overline{DO}$ rises to a more positive potential, and the signal DO drops to a low level to inhibit one input to each of the gates 724 and 728. This inhibit is in addition to inhibits previously supplied by the signal source in the input control circuit 110.

The decrementing of the keyboard register 106 and the incrementing of the storage register 112 continues until such time as the keyboard register 106 is returned to a zero setting. At this time, the value standing in the storage register 112 is equal to the value previously stored in the register 106. When the keyboard register 106 is restored to a normal condition, the inverted signal $\overline{ADO}$ drops to a low level so that the signal ADO at the output of the inverter 722 rises to a more positive level. When the signal $\overline{ADO}$ drops to a low level, an inhibit is applied to the upper input of the gate 710, and the generation of the signals CDA and $\overline{CDA}$ is terminated. Further, the change in the states of the signals ADO and $\overline{ADO}$ maintains the inhibit on the J input to the flip-flop 708 and provides an enabling input to the K input to this flip-flop so that the next clock signal C rests the flip-flop 706. The resetting of the flip-flop 706 completes the enabling of the gate 708 so that the output of this gate applies a further inhibit to the gate 710. In addition, the output signal AD from the flip-flop 706 drops to a more negative potential.

The operator can then check the visual display of the estimate number transferred from the keyboard register 106 into the storage register 112 by observing the digital display unit 114. If the entered estimate number is correct, the operator then enters this estimate number into the system 100 by placing the output control circuit 116 in operation to transfer the quantity standing in the storage register 112 through the output steering circuit 118 to the output recorder 102. The output steering circuit 118 is illustrated in FIG. 11 of the drawings in conjunction with portions of the output recorder 102. This recorder is adapted to punch seven parallel columns of information on the tape, but in the system 100 only six of these columns are utilized. In FIG. 11 of the drawings, there are illustrated six individual punch control assemblies 1110–1115 for controlling punching in the first, second, third, fourth, fifth, and seventh columns of the tape, respectively. The controls 1110–1113 are used to punch information in accordance with the binary weights "1," "2," "4," and "8." The control 1114 is provided for punching in the fifth column which is a bit required by the data processing unit to which the punch tape is fed but which does not have digital significance insofar as the system 100 is concerned. The sixth control 1115 provides perforations in the seventh column of the tape and is controlled by a parity signal generator 1140 to provide a parity bit in accordance with the input data supplied to the punch controls 1110–1114.

The output steering circuit 118 includes four decoding means or arrays of gates 1100–1103 which sequence the application or signals from the system 100 to the punch controls 1110–1113 in accordance with the desired output format. The gating assemblies 1100–1103 are each capable of steering 16 successive input signals to the punch controls 1110–1113 under the control of 16 successive steering signals SEO–SE15 supplied by the output control circuit 116. The input signals from the system 100 which are to be supplied in succession to the punch controls 1110–1113 are shown schematically in FIG. 11 along the upper edge of the rectangular logic symbol for the gating arrays 1100–1103.

The output format used in the system 100 is such that the first and second digits of the area designation provided by the keys 232 and 234 are provided in the first two steering out positions SEO and SE1. The tens and units digits of the binary coded representation of the categories supplied by the actuation of the keys 244 are provided in the next two positions defined by the signals SE2 and SE3. The next three positions defined by the steering signals SE4–SE6 supply the data represented by the three subcategory selecting keys 254, 264, and 274, respectively. The next position defined by the steering signal SE7 is not used. In the next position defined by the steering signal SE8, control characters are provided. The actuation of the code delete key 204 provides a signal for the binary "1" punch control 1110. An end of block signal generated by the output control circuit 116 provides a binary "4" signal for the punch control 1112 in the position defined by the steering output signal SE8. The input control circuit 110 provides a signal for the binary " 8" punch control 1113 in the position defined by the steering output signal SE8 representing a negative quantity. In the next two positions defined by the steering out signals SE9 and SE10, signals are provided representing the settings of the special category switches 218 and 220, respectively. The next five positions defined by the steering signals SE11–SE15 provide data representing the value of the ten thousands, thousands, hundreds, tens, and units digits of the quantity stored in the storage register 112. The last of these positions defined by the signal SE15 is also used for a checksum total on only the recording operation performed incident to terminating a block of information.

Accordingly, to supply the information to the output gate units 1100–1103, the cable 880 (FIGS. 8 and 11) extends from the output of the stages 870, 872, 874, 876, and 878 of the storage register 112 to the inputs of the units 1100–1103 enabled by the steering signals SE11–SE15, as illustrated in FIG. 11. Since two different bits of information can be recorded by the recorder 102 in the last steering position defined by the signal SW15, the four output leads from the units digit stage 870 representing the binary weights "1," "2," "4,", and "8" are supplied to the units 1100–1103 through four NAND gates 1122, while four correspondingly weighted input signals HS1, HS2, HS4, and HS8 from a checksum circuit 1000 are supplied through four NAND gates 1123. These two sets of gates 1122 and 1123 are selectively enabled under the control of the output control circuit 116.

Whenever one of the binary weighted bits is present in a steering out position enabled by one of the signals SEO–SE15, the input to the related gate assembly 1110–1103 is provided with a more positive signal, and this gate assembly provides a corresponding high level or more positive output signal D1–D4. This signal is supplied to one input of four NAND gates 1130–1133, the other input of which is supplied with a strobe or gating signal OSF by the output control circuit 116. Thus, the fully enabled ones of the gates 1130–1133 supply a more negative signal CH1–CH4 to effect actuation of the punch control units 1110–1113.

Referring now more specifically to the output control circuit 116, the priming of the cue switch flip-flop 920 to its set condition by the signal $\overline{ON}$ when the system 100 was placed in operation was described above. In addition, the inverted signal $\overline{ON}$ resets three flip-flops 922, 950, and 980 to provide the more positive inverted output signals $\overline{CHE}$, $\overline{EFF}$, and *FF from these three flip-flops. The more positive signal $\overline{CHE}$ partially enables four gates 1122 to which the four bits of the units digit of the quantity stored in the stage 870 of the storage register 112 are supplied over the cable 880. Since the signal CHE is at a low level, the four gates 1123 are inhibited.

The inverted signal $\overline{ON}$ resets a conventional four stage binary counter 968 to its normal reset or zero position. The output of the counter 968 is coupled to the input of a conventional decoding circuit 970 which supplies the output steering signals SE0–SE15. The decoding circuit 970 is such that one and only one of the output signals SE0–SE15 rises to a more positive or true level in each of the 16 distinct settings of the four stage counter 968. Thus, when the inverted resetting signal $\overline{ON}$ is applied to the counter 968, the steering output signal SE0 is the only output from the decoding circuit 970 at a more positive level.

The operator initiates the transfer of the estimate now stored in the storage register 112 to the output recorder 102 by actuating the enter key 210 (FIG. 2) so that a pair of normally open contacts 210A (FIG. 9) are momentarily closed. Thus, the output of a gate 934 momentarily goes to a more positive potential and then drops to a more negative potential. This potential is supplied to one gate input of a monostable circuit 936, the other input of which is supplied with a more positive signal EOC. When the output of the gate 934 drops to a more negative potential, the monostable circuit 936 is triggered to supply a more positive signal of around 300 milliseconds duration to one input of a NAND gate 938, the other input of which is normally enabled by a NAND gate 944 and an inverter 946. Thus, a positive-going enter signal EO and an inverter enter signal $\overline{EO}$ of the indicated duration are generated. The signal EO completes the enabling of a NAND gate 972, the other input of which is provided with a more positive signal OFF. The more negative output from the gate 972 primes the first and second stages of the counter 968 to a set condition. The more negative signal at the output of the gate 972 is applied to one input of a NAND gate 976 and is effective through an inverter 978 to prime the fourth or last stage of the counting circuit 968 to its set condition. With the first, second, and fourth stages of the counter 968 primed to a conductive condition, the decoding circuit 970 is controlled so that the signal SEO is no longer more positive, and the signal SE11 is positive. Thus, the actuation of the enter key 210 primes the counting circuit 968 to a setting in which the output steering circuit 118 is conditioned for a shortened scan or cycle of operation.

The negative-going signal at the output of the gate 972 provides the inverted signal $\overline{EOQ}$ which is applied to one input of a gate 918 connected to the clock terminal of the flip-flop 920. When the monostable circuit 936 times out, the inverted signal $\overline{EOQ}$ returns to a more positive level, and the output of the gate 918 drops to a more negative level to toggle the flip-flop 920 so that the signal QFF becomes more negative and the inverted signal $\overline{QFF}$ becomes more positive. The change in the status of the signal $\overline{QFF}$ controls the amplifier 930 to terminate the illumination of the lamp 932 so that the legend "ESTIMATE 0" is no longer illuminated. This signal is also effective through the inverter 924 and the amplifier 926 to illuminate the lamp 928 so that the legend "END" on the cue switch 208 is now illuminated. The change in the status of the signal QFF also removes one inhibit from the gate 782 (FIG. 7) to permit the input detector circuit 124 to be used in the future and following the recording cycle in which the estimate number is recorded.

The inverted enter signal $\overline{EO}$ is applied to one input of a gate 900 so that the trailing edge of this signal is effective to trigger a monostable circuit 902. This circuit provides a positive-going signal to the input of an inverter 904 having a duration on the order of 1 second. The output of the inverter 904 thus drives one input to a NAND gate 906 negative for the indicated period. Another input to the gate 906 is supplied by the inverted enter signal $\overline{EO}$. Thus, whenever the enter key 210A is actuated and for a period of approximately 1.3 seconds thereafter, the output of the gate 906 is driven to a more positive potential to control a connected inverter 908 so that the signal EOC is driven to a more negative level. The signal EOC applies an inhibit to the input of the monostable circuit 936 and to one input of a timing circuit 912 controlled by the cue switch 208. Thus, the signal EOC inhibits control of the output control circuit 116 by either the enter switch 210 or the cue switch 208 for a period of around 1.3 seconds following the actuation of the enter switch 210.

The negative-going signal $\overline{EO}$ also changes the state of the flip-flop 950. More specifically, all of the inputs to a NAND gate 948 are normally held at a more positive potential by the inverted signals $\overline{EO}$ and $\overline{COQ}$, and the output of a gate 982. When the negative-going signal $\overline{EO}$ is generated, the output of the gate 948 goes positive and then returns to its negative level to toggle the flip-flop 950 to its set state to supply a more positive output signal EFF, the inverted signal $\overline{EFF}$ dropping to a more negative potential. The low level of the inverted signal $\overline{EFF}$ applies an inhibit to the gate 944 which is effective through the inverter 946 and through another NAND gate 940 and inverter 942 to inhibit the provision of outputs from monostable circuits 912 and 936. This inverted signal $\overline{EFF}$ also inhibits one input to a gate 776 (FIG. 7) to drive the output of this gate to a more positive potential. This signal is effective through an inverter 778 to provide the inverted inhibiting signal $\overline{IN}$. This signal, as described above, applies an inhibit to one input of the gate 518 at the output of the monostable circuit 516 providing the strobe or shift signal for transferring entries from the keyboard 108 into the keyboard register 106. Thus, the transfer of data entries into the keyboard register 106 is inhibited during a recording operation. The more negative output from the inverter 778 also applies an inhibit to one input of a NAND gate 780 so that the lower input to the gate 784 is held at a more positive potential to prevent transfer of data into the storage register 112 from the detector input circuit 124 during a recording operation.

The inverted signal $\overline{EO}$ (FIG. 9) developed by the key 210 also initiates the application of input pulses to the counting circuit 968. More specifically, all three inputs to a NAND gate 954 are normally held at a more positive level so that the output of this gate is normally at a low level to hold one input to a monostable timing circuit 956 at this level and to hold a signal DR at this level. When, however, the inverted enter signal $\overline{EO}$ is generated, the signal DR and the input to the timing circuit 956 rise to a more positive level. At the end of the inverted signal $\overline{EO}$, the timing circuit 956 is triggered by the negative-going trailing edge to develop a more positive signal of about 20 milliseconds duration at its output which is applied to one input of a NAND gate 958. The other input to this gate is supplied with the inverted signal $\overline{ON}$ which inhibits the output from the timing circuit 956 during the resetting of the system 100 occasioned by actuating the on-off switch 202. Thus, the gate 958 is fully enabled to develop the negative-going signal $\overline{OSF}$ and to develop through an inverter 960 the signal OSF. The signal OSF is used to strobe or clock the outputs from the output steering circuit 118 (FIG. 11) to the punch control units 1110–1115.

More specifically, with the decoding circuit 970 supplying a more positive enabling potential for only the signal SE11, the gate assemblies 1100–1103 are enabled to supply positive-going signals D1–D4 to one input of the gates 1130–1133 in dependence on the four received bits from the ten thousands digit stage 878 in the storage register 1112. The other input to the gates 1130–1133 is supplied by the signal OSF so that a combination of the signals $\overline{CH1}$–$\overline{CH4}$ drop to a low level in dependence on the value of the ten thousands digit of the estimate number. As set forth above, this selectively controls the punch control units 1110–1113 to punch a binary coded representation of the value of this digit. Further, since the code required by the data processing unit with which the output tape from the recorder 102 is to be used requires a punch in the fifth channel, the gate 1134 is fully enabled by the signal OSF and the inverted signal $\overline{*FF}$ derived from the reset flip-flop 980 (FIG. 9). This controls the punch control unit 1114 to produce a perforation in the fifth channel.

The actuation of the control 1115 for the seventh channel punch is dependent upon whether or not a bit is required for parity and is determined by the parity bit generating circuit 1140 which is arranged to insure even parity with respect to the total number of bits recorded on the tape by the control units 1110–1115.

More specifically, the parity bit generating circuit 1180 includes four exclusive OR or half adder circuits 1141–1144. The bit inputs for the circuits 1141 and 1142 are the signals $\overline{CH1}$–$\overline{CH4}$ derived from the outputs of the gates 1130–1133 and which are more negative when a binary bit is present. Thus, if an even number of intelligence bits is present, the output of the circuit 1143 and thus one input to the exclusive OR gate 1144 are at low level. However, the other input to the gate 1144 always receives a more positive signal from the output of the gate 1134 through an inverter 1146 because the punch control unit 1114 is always actuated in each entry. Thus, the inputs to the gate 1144 are odd when the number of intelligence bits is even, and a high level signal is supplied at the output of the circuit 1144 and forwarded through an inverter 1145 to operate the punch control unit 1115 to provide an additional or even number of bits on the tape corresponding to the even number of intelligence bits. On the other hand, if an odd number of intelligence bits is present, the output of the gate 1143 is at a high level, and since the other input to the exclusive OR gate 1144 is always at a high level, an output is not provided to the inverter 1144 and the punch control 1115 is not operated to provide a parity bit. In this situation since the number of intelligence bits is odd, the bit provided by the punch control unit 1114 provides an even number of bits on the tape.

In this manner, the first digit of the estimate number is recorded on the tape by the output recorder 102 under the control of the steering out signal SE11 provided by the decoding circuit 970 with the counter 968 in the initial condition to which it was primed by the actuation of the enter key 210 incident to entering the estimate number. During this recording operation, a parity bit is selectively provided by the parity bit generating circuit 1140 in dependence on the number of bits in the value of the entry. The inverted signal $\overline{OSF}$ developed concurrently with the recorder output strobe signal OSF is used at various places in the system 100 such as a gate 600 in the detector input circuit 124 and the gate 776 in the input control circuit 110 to inhibit data entry during the output recording operation.

At the end of the timing period of the circuit 956, the signal OSF drops to a low level and triggers a timing circuit 962 to provide a more positive signal to an input of an inverter 964, this signal having a duration on the order of 20 milliseconds. The output of the inverter 964 provides for a more negative or inverted output signal $\overline{OSD}$ which provides a recording cycle inhibit in the same manner as the signal $\overline{OSF}$. The signal $\overline{OSD}$ also inhibits an input to the gate 944 in the output control circuit 116. This signal is also forwarded through an inverter 966 to provide the signal OSD which is returned to one input of the gate 952. The other input to this gate is enabled by the signal EFF so that the output of the gate 962 drops to a more negative potential and is effective through the gate 954 to drive the gate input to the timing circuit 956 in a positive direction and to hold this input at a more positive potential throughout the 20-millisecond duration of the signal OSD.

When the signal OSF drops to a more negative potential to trigger the timing circuit 962, this negative-going signal also clocks the input stage to the counter 968 so that the first two stages of this counter are reset and the third stage representing the binary value "4" is set. This controls the decoding circuit 970 to remove the positive enabling signal SE11 and to supply the positive enabling signal SE12. This signal selects the gate in the gate arrays 1100–1103 in the output steering circuit 1118 to which are connected the four input leads from the cable 880 extending to the outputs of the stage 876 in the storage register 112 in which is stored the value of the thousands digit of the estimate number. Thus, the gate arrays 1100–1103 provide high and low level signals D1–D4 to one input of each of the gates 1130–1133 in accordance with the value of the next digit to be recorded. The punch control units 1110–1115 are not controlled at this time inasmuch as the strobe signal OSF is at a low or inhibiting level.

When the circuit 962 times out, the signal OSD drops to a negative level, the output of the gate 952 rises to a more positive level, and the output of the gate 954 drops to a more negative level to trigger an additional cycle of operation of the timing circuit 956. This results in the generation of the signals OSF and $\overline{OSF}$ and transfers the output data to the punch control units 1110–1115 through the gates 1130–1134 in the manner described above.

This operation continues until such time as the five digits of the estimate number stored in the storage register 112 are transferred through the output steering circuit 118 to the output recorder 102. In this connection, the resetting of the flip-flop 922 in the output control circuit 116 provides a more positive signal $\overline{CHE}$ to enable the gates 1122 so that the units digit can be supplied in the last position when the steering signal SE15 is provided rather than the output signals from the checksum circuit 1000.

In addition, the steering signal SE15 is supplied to one of the J inputs to the flip-flop 980 and the signal OSF is applied to the clock terminal of this flip-flop. Accordingly, when the signal OSF drops to a low level to terminate the enabling of the gates 1130–1134 at the conclusion of the recording of the units digit of the estimate, the flip-flop 980 is set to drive the inverted signal $\overline{*FF}$ to a more negative level and to apply a more positive signal to one input of the gate 982. The more negative inverted signal $\overline{*FF}$ applies a further inhibit to the gates 776 and 944.

The positive signal applied to one input of the gate 982 is used to reset the flip-flop 950. More specifically, the other input to the gate 982 is supplied with the signal OSD which is at a more positive level because the generator 962 is triggered by the trailing edge of the signal OSF. Thus, the low level output from the gate 982 is effective through the gate 948 to place the clock terminal of the 950 at a more positive potential. When the signal OSD drops to a low level, the output of this gate becomes more positive, the gate 948 is fully enabled, and a negative-going signal is applied to the clock terminal of the flip-flop 950 to toggle this flip-flop to its reset condition in which the inverted signal $\overline{EFF}$ is more positive and the signal EFF is more negative. The more negative signal EFF coupled with the preceding drop in the level of the signal OSD is effective through the gate 952 to fully enable the gate 954 so that the generator 956 is triggered to again develop the signal OSF.

Referring back to the preceding cycle of operation of the circuit 956, when the trailing edge of the output signal OSF therefrom reset the flip-flop 980, this trailing edge advanced the counter 968 to its zero setting in which the decoding circuit 970 provides the positive enabling signal SE0 and removes the positive signal SE15. This does not effect the resetting of the flip-flop 980 since the input gates are read while the signal OSF is positive and transferred to the output when the signal OSF drops to its low level. The toggling of the flip-flop 980 to a condition in which the inverted output signal $\overline{*FF}$ drops to a low level provides an inhibit to the first stage of the counter 968. This inhibit prevents the trailing edge of the next following signal OSF generated during the resetting of the flip-flops 980 and 950 from advancing the counter 968 from its zero setting. The trailing edge of this particular signal OSF is effective, however, to toggle the flip-flop 980. Thus, the flip-flop 980 is reset to apply another inhibit to one input of the gate 982 and to drive the signal $\overline{*FF}$ to a more positive potential. This permits the counter 968 to be advanced by subsequent signals OSF. The generation of these signals is inhibited, however, because the resetting of the flip-flop 950 places the signal EFF at a low level to inhibit the gate 952. The resetting of the flip-flop 950 also removes the inhibit provided by the signal $\overline{EFF}$ at the places indicated above to free the detector input circuit 124 and the input control circuit 110 for use in transferring data into the storage register 112. The resetting of the flip-flop 950 and the resetting of the flip-flop 980 also removes the inhibit from the gate 944 so that the output control circuit 116 can respond to actuation of the enter key 210. The resetting of these two flip-flops in conjunction with the resetting of the flip-flop 920 also frees the output control circuit 116 for control by the cue switch 208. In addition, the resetting of the flip-flop 920 has terminated the illumination of the lamp 932 and has illuminated the lamp 928 so that the legend "END" on the cue switch 208 is illuminated to indicate that the actuation of the cue switch will terminate a data block.

Further, the setting and the resetting of the flip-flop 980 at the end of the recording cycle is effective to restore the input control circuit 110 to its normal condition and to clear the storage register 112. More specifically, the inverted signal $\overline{*FF}$ is supplied through a normally closed pair of contacts 214B on the hold quantity key 214 to one input of the NAND gate 770. When the flip-flop 980 is set, the low level signal $\overline{*FF}$ drops to a low level and the amplifier 774 provides the low level reset signal $\overline{RS}$. This resets any of the flip-flops 706, 720 and 730 in the input control circuit 110 (FIG. 7) which were left in a set condition in transferring data from the keyboard register 106 to the storage register 112. The signal $\overline{RS}$ also clears the storage register 112 to its normal setting and thus returns the signal $\overline{DO}$ to its low level. This resetting signal is removed when the flip-flop 980 is reset by the next cycle of operation of the timer 956 in the manner described above.

Entering a Data Item Using the Keyboard 108

When a data item is to be entered into the system 100 using the keyboard, the area, category, and subcategory switches or keys are selectively actuated in the manner described above to select and identify both the area in which the material is to be used as well as its characteristics. Following these operations a quantity can be entered using the keyboard 108.

A two-digit binary coded hexadecimal entry identifying the areas is made by selectively pressing one of the keys 232 and one of the keys 234 in the bank 230. The depression of these keys closes one or more contacts to provide binary coded signals representing the digital designation of the selected area. As an example, there is illustrated in FIG. 11 of the drawings a pair of normally open contacts 232A controlled by one of the keys 232 which when closed applies an inhibit to one input of two of the NAND Gates 1120 which are coupled to the input selected by the first steering out enabling signal SE0 in the gate arrays 1100 and 1101. The closure of the contacts 232A, in inhibiting the connected gates 1120, provides more positive potentials representing the binary weights "1" and "2" for recording during an output recording cycle. The actuation of one of the keys 234 closes contacts corresponding to the contacts 232A to provide input marking to the gate arrays 1100–1103 in the position selected by the steering signal SE1.

The operator then depresses one of the keys 244 in the category bank 240 to select the category of material for which data is to be entered. The actuation of one of the keys 244 also closes two sets of contacts similar to the contacts 232A (FIG. 11) to provide marking conditions at the input to the gate arrays 1100–1103 in accordance with the binary coded tens and units digits of the category selected, which inputs are enabled by the steering signals SE2 and SE3 during a recording cycle.

In addition, the actuation of one of the keys 244 places the chart drive control circuit 122 in operation so that legends appear in the windows 252, 262, and 272 of the subcategory banks 250, 260, and 270 corresponding to the selected categories.

Figure 3:
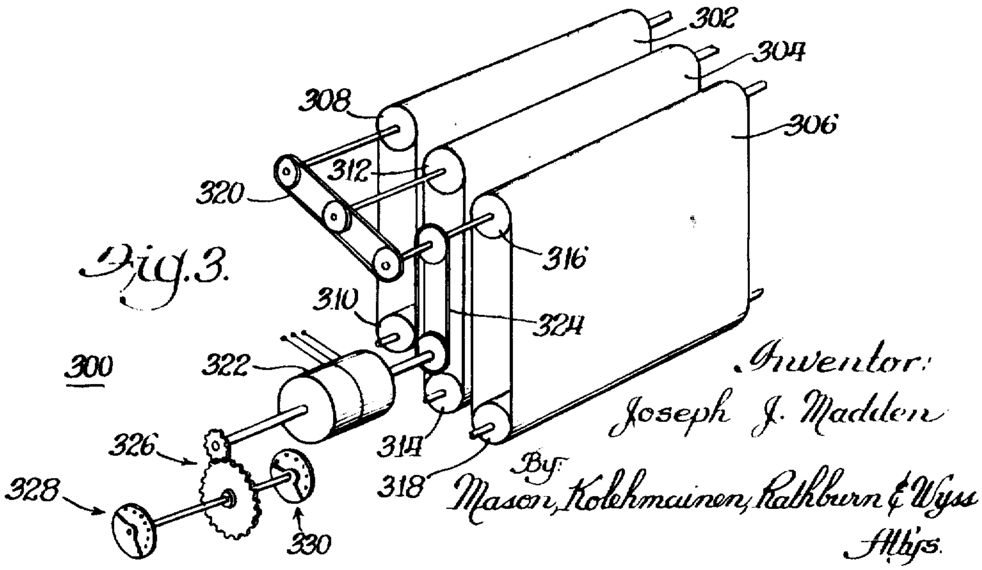
FIG. 3 is a simplified perspective view of a drive system for supplying different sets of visual data to the console.

Referring now more specifically to FIG. 3 on the drawings, therein is illustrated in schematic form a chart drive for selectively supplying legends to the windows 252, 262, and 272 in the subcategory selecting banks 250, 260, and 270. The chart drive assembly includes three elongated webs or charts 302, 304, and 306 which respectively pass over pairs of drive-idler rollers 308, 310, 322, 314, 316, and 318. The charts 302, 304, and 306 carry printed legends further defining, as set forth above, the size, type, method of installation, etc. of a selected category of material and provide as many different sets of legends as there are categories to be selected by the bank 240.

To provide means for selectively positioning the charts 302, 304, 306, the rollers 308, 312, and 316 carry pulleys thereon coupled by a common drive belt or chain 320. The shaft for the roller 216 is coupled to a drive motor 322 through a drivebelt or chain 324. The motor 322 is a reversible motor. This drive motor also is effective through a drive means or gear train indicated generally as 326 to drive a pair of selector switches 328 and 330. The selector switches 328 and 330 form a part of the chart drive control circuit 122 and are used to control the energization of the motor 322 to operate this motor in forward or reverse direction in dependence on the shortest path of travel required to place the proper legends on the charts 302, 304, and 306 in proper viewing position adjacent the key banks 250, 260, and 270.

Figure 4:
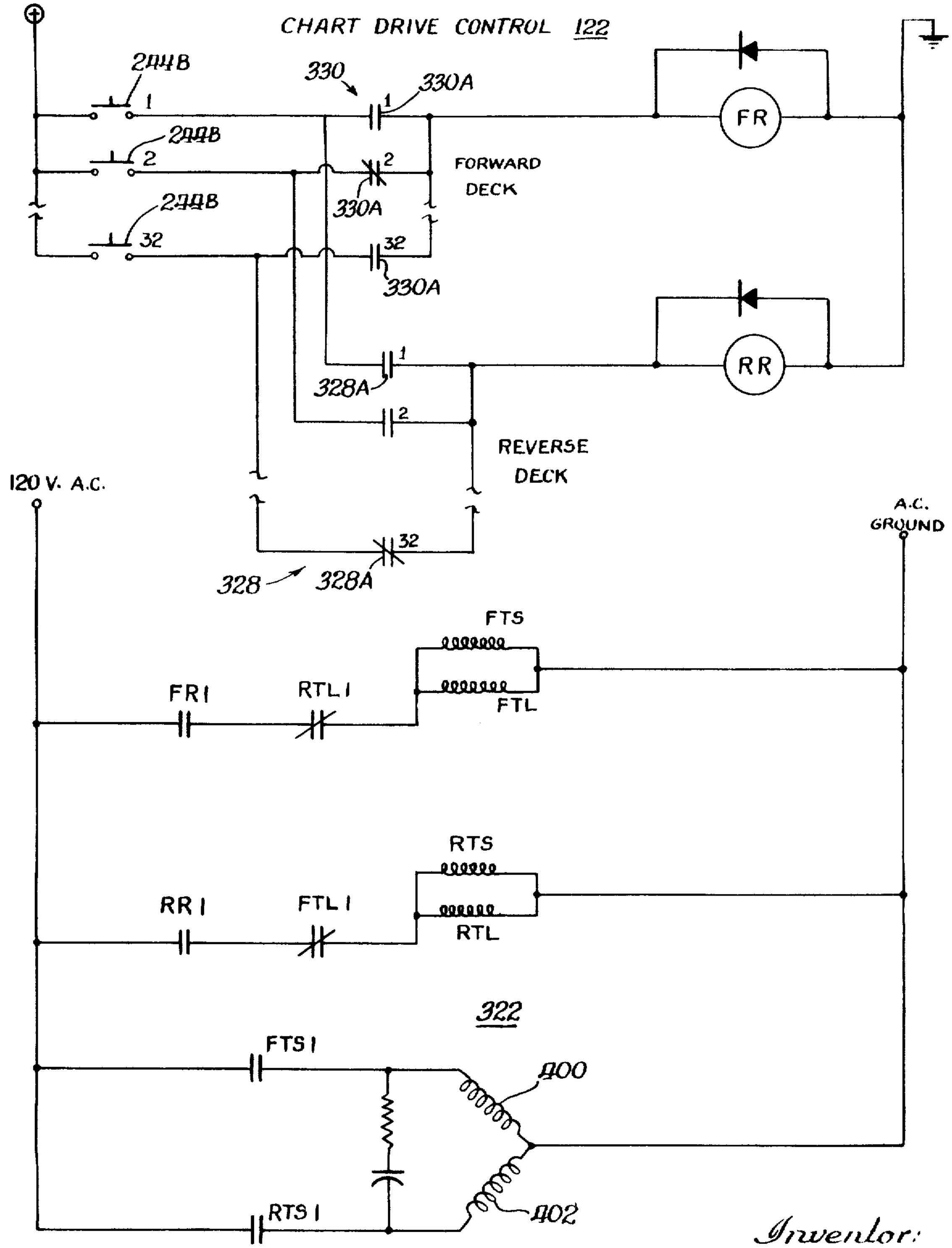
FIG. 4 is a schematic circuit diagram of a circuit for controlling the operation of the chart drive shown in FIG. 3.

More specifically and as illustrated schematically in FIG. 4 of the drawings, each of the switches 328 and 330 includes a number of contacts 328A, 330A equal to the number of selector switches 244 in the bank 240. The wiper of one of the switches 328 and 330 bridges one-half of its contacts and the wiper on the other switch bridges the other half less one, with the bridged contacts on the two switches 328 and 330 not being overlapped. In other words, assuming that the charts 302, 304, and 306 are in positions previously selected by the depression of the key 244 designated as "1", the wiper for the forward switch 330 bridges or closes the contacts associated with the keys 244 identified as "2–16" while the wiper on the reverse switch 320 bridges or closes the contacts associated with the keys 244 identified as "17–32". Thus, the contacts 330A in the switch 330 associated with the keys 244 identified as "17–32" and "1" are opened, while in the switch 328 the contacts 328A associated with the keys 244 identified as "1–16" are opened. This condition is illustrated in the chart drive control 122 shown in FIG. 4. Thus, the arrangement on the switches 328 and 330 is such that on the forward switch 330 the contacts 330A are closed for those of the pushbuttons 244 representing chart positions most quickly reached by operation of the motor 322 in its forward direction, while on the switch 328 the contacts 328A are closed which are coupled to keys 244 reached most rapidly by operation of the motor 322 in a reverse direction.

Assuming that the key 244 identified as "2" is operated by the operator with the chart drive control 12 in the position illustrated in FIG. 4, the contacts 244B bearing this designation are closed, and a circuit is completed through the closed contacts 330A to energize a forward drive relay FR. The closure of the contacts on the key 244 designated as "2" does not complete an operating circuit over the switch 328 because the related contacts 328A are open. The operation of the relay RF closes a pair of normally open contacts FR1 to complete an obvious operating circuit through a pair of normally closed contacts RTL1 for the windings of two relays FTS and FTL. The operation of the relay FTL opens a pair of normally closed contacts FTL1 to inhibit operation of a group of reverse drive control relays. The operation of the relay FTS closes a pair of normally open contacts FTS1 to energize a forward drive winding 400 in the motor 322 so that the motor operates in a forward direction to start forward movement of the charts 302, 304, and 306. Since the charts 302, 304, and 306 are normally in a position associated with the key "1", the legends associated with the key 244 designated as "2" are advanced to the windows 252, 262, and 272 immediately upon energization of the winding 400, and the switch 330 opens the contacts 330A designated as "2".

This terminates the energization of the winding of the relay FR to open the contacts FR1 and thus terminates the energization of the windings for the relays FTS and FTL. Both of these relays are slow-to-release, with the relay FTS having a release delay on the order of 100 milliseconds and the relay FTL having a release time on the order of 1 second. Accordingly, the contacts FTS1 are first opened to terminate the energization of the winding 400 to stop forward movement of the motor 322 with the legends associated with the depressed key 244 in a viewing position adjacent windows 252, 262, and 272. After a further delay, the relay FTL releases to close the contacts FTL1. These time delays allow for the inertia of the drive system and insure proper positioning of the legends adjacent the viewing windows.

Assuming, however, that the 244 designated as "32" is operated than the key designated as "2,", the closure of this contact would not energize the forward relay because the related contacts 330A are opened. However, the contacts 328A are closed and an operating circuit is completed for the winding of a reverse relay RR. The operation of the relay RR closes a pair of normally open contacts RR1 which is effective through the now closed contacts FTL1 to energize a pair of reverse control relays RTS and RTL. The energization of the relay RTL opens the contacts RTL1 to prevent operation of the forward drive relay. The operation of the relay RTS closes a pair of normally open contacts RTS1 to energize a reverse drive winding 402 in the motor 322 so that the motor 322 operates in a reverse direction to move the charts 302, 304, and 306 in a reverse direction. Since the legends on these charts corresponding to the selected key 244 immediately follow the legends in viewing position adjacent the windows 252, 262, and 272, they are immediately moved into viewing position, and the contacts 328A associated with the key 244 designated as "32" are opened to release the relay RR. The release of this relay opens the contacts RR1 and terminates the energization of the windings RTS and RTL. These two relays are slow-to-release, having delay intervals of around 100 milliseconds and 1 second, respectively. Thus, the termination of the energization of the windings for these relays terminates the energization of the reverse drive winding 402 and prepares the energizing circuit for the forward control relays FTS and FTL.

Thus, the two switches 328 and 330 driven by the motor 322 permit the chart drive control circuit 122 to operate the motor 322 in the direction resulting in the least possible movement or elapsed time going from the legends for the last operated selector or key 244 to the legends for the presently operated key 244. Further, by providing the elongated charts 302, 304, and 306 with the variable message or legend material thereon, the amount of identifying data that can be provided for the assistance of the operator is greatly increased without increasing the size of the control console for the system 100.

Figure 5:
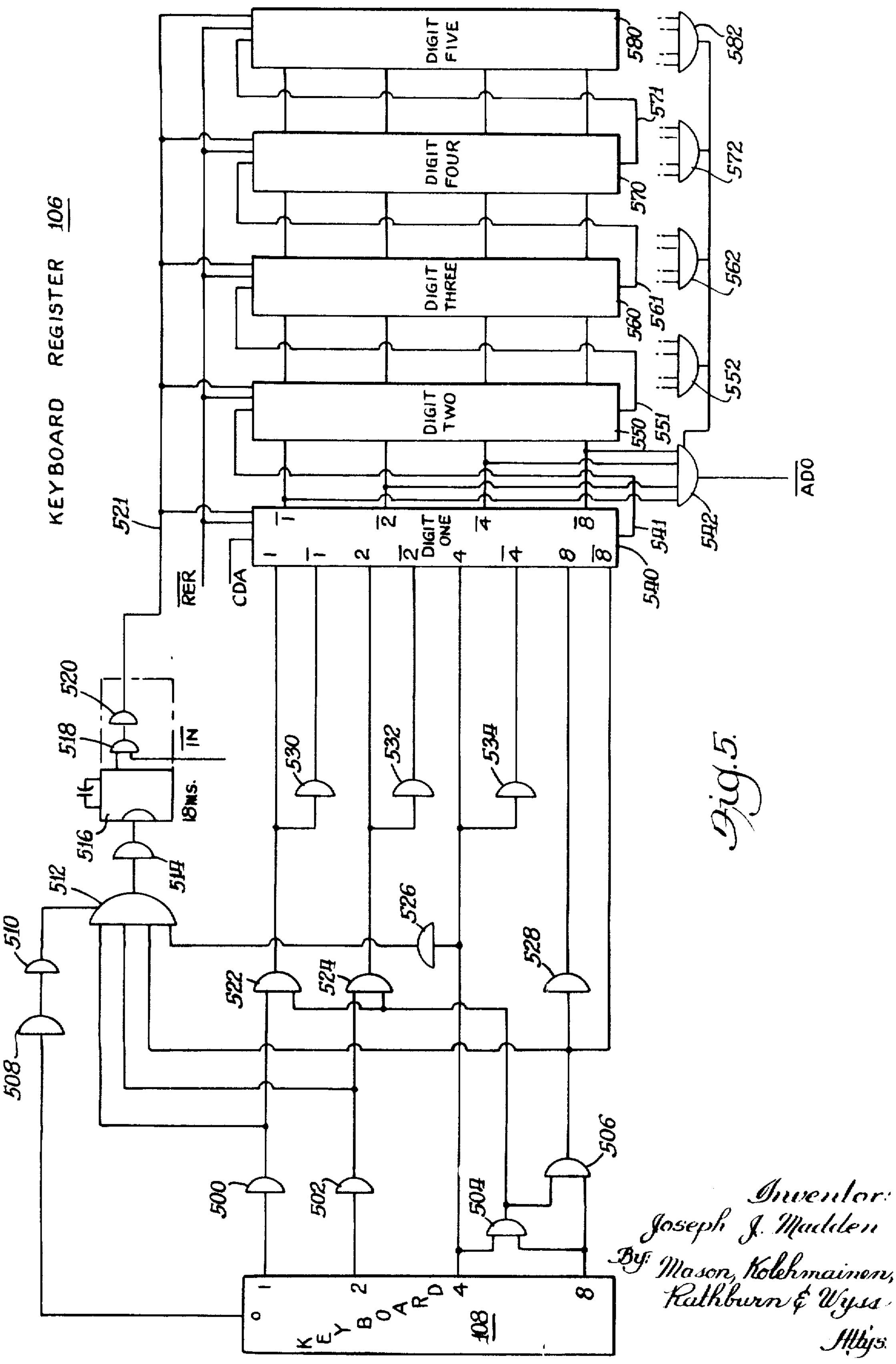
FIG. 5 is a schematic circuit diagram of a keyboard input and storage unit forming a part of the system.

The actuation of the chart drive control 122 in effecting the operation of either the forward control relay FTL or the reverse control relay RTL closes an additional one of two pairs of contacts FTL2 or RTL2 (FIG. 12). The selective closure of either of these two pairs of contacts supplies the more negative resetting signal $\overline{RER}$. This signal, as set forth above, clears the keyboard register 106 (FIG. 5). It also provides a momentary inhibit to the gate 780 in the input control circuit 110 (FIG. 7) to prevent the transfer of data from the detector input circuit 124 to the storage register 112 through the input control circuit 110 and applies an inhibit to the gate 944 in the output control circuit 116 (FIG. 9) to prevent use of either the cue switch 208 or the enter switch 210. The inverted reset signal $\overline{RER}$ is removed whenever the forward relay FTL or the reverse relay RTL is released.

The operator now actuates a single key 254, 264, and 274 in each of the banks 250, 260, and 270 to close contacts similar to the contacts 232A (FIG. 11) to provide binary marking conditions representing the hexadecimal code corresponding to the selected material subcategory. These signals are rendered effective to control the gate arrays 1100–1103 when the steering signals SE4–SE6 are provided during a recording cycle. The operator also sets, if necessary, the special category switches 218 and 220 which also provide marking conditions that are rendered effective to control the gate arrays 1100–1103 when the steering signals SE9 and SE10 are supplied.

The operator, as by visually inspecting the drawing, determines for example the number of parts required in the area specified in the bank 230, of the part specified by the key banks 250, 260, and 270 and keys this quantity into the keyboard register 106 by manual actuation of the keyboard 108. The value of the quantity is transferred from the keyboard 108 into the keyboard register 106 in the manner described above. If an error is made in keying the quantity into the keyboard register 106, the operator actuates the error reset key 108A in the keyboard 108 (FIG. 2) to momentarily close a correspondingly numbered error reset set of contacts (FIG. 12) to develop the reset signal $\overline{RER}$. As set forth above, this clears the keyboard register 106 (FIG. 5) to permit the entry of a correct amount.

When the operator is satisfied that a correct amount has been entered into the keyboard register 106 from the keyboard 108, the add switch 108C is operated to close the correspondingly designated contacts in the input control circuit 110 (FIG. 7) so that the add flip-flop 706 is set. The value standing in the keyboard register 106 is transferred to the storage register 112 in the same manner described above. At the end of this operation, the quantity is stored in the storage register 112, and the keyboard register 106 is in its zero setting.

In the event that the operator now determines that this quantity is to be reduced, for example, because an excessive value has been entered into the storage register 112, the operator then keys the number into the keyboard 108 that is to be subtracted from the quantity stored in the storage register 112. This quantity is transferred from the keyboard 108 to the keyboard register 106 in the manner described above. This subtractive entry is transferred from the keyboard register 106 to the storage register 112 by actuating the minus or subtract key 108B in the keyboard 108 (FIG. 2) to momentarily close a pair of correspondingly numbered contacts 108B in the input control circuit 110 (FIG. 7).

The momentary signal provided by the closed contacts 108B is effective through an inverter 714 to complete the enabling of a NAND gate 716 since the inverted signal $\overline{ADO}$ is high because of the presence of at least one bit in the keyboard register 106. The full enabling of the gate 716 is effective through the inverter 718 to cause the setting of the subtract or minus flip-flop 720 when the next clock pulse C is applied to the clock pulse input of this flip-flop. When the flip-flop 720 is set, the subtract signal SU becomes more positive, and the inverted signal $\overline{SU}$ becomes more negative. Since the inverted signals $\overline{DO}$ and $\overline{MFF}$ are at a more positive level when the signal SU becomes more positive, a gate 752 is fully enabled and its output drops to a low level to pull the input to the amplifier 744 and the inverter 746 to a low level. This signal is effective through the inverter 746 and the amplifier 748 to provide a more positive potential to the down or reverse counting terminal DN of the storage register 112, and a more negative potential is applied to the forward or up counting terminal UP of this register. Thus, the storage register 112 is conditioned to count in a reverse direction or in a subtractive sense.

The setting of the flip-flop 720 also applies the inverted subtract signal $\overline{SU}$ to one input of the gate 708 so that its output rises to a more positive potential. Since an entry is stored in the keyboard register 106, the inverted signal $\overline{ADO}$ is more positive, and the gate 710 follows the clock pulses C to provide the signals CDA and $\overline{CDA}$. These signals are effective to count down in both the keyboard register 106 and the storage register 112 so that the quantity previously standing in the storage register 112 is reduced by the amount standing in the keyboard register 106. If the quantity in the keyboard register 106 to be subtracted from the quantity standing in the storage register 112 is smaller in value, the operation of transferring the value from the keyboard register 106 to the storage register 112 terminates in the manner described above except that the subtract flip-flop 720 is reset when the keyboard register 106 is advanced to zero and places the signal ADO at a more positive level to enable one of the K inputs to this flip-flop.

Assuming, however, that the quantity stored in the keyboard register 106 which is to be subtracted from the quantity standing in the storage register 112, is greater in value, the storage register 112 during the transfer of data from the keyboard register 106 to the register 112 will arrive at a zero setting in which the signal $\overline{DO}$ drops to a low level, while the signal $\overline{ADO}$ remains at a high level indicating that the value has not been completely transferred from the keyboard register 106. At that time, the NAND gate 724 becomes fully enabled. The upper input to this gate is supplied with a more positive potential from the subtraction flip-flop 720, and the next input to the gate 724 receives a more positive potential from the signal $\overline{ADO}$. The next input receives a more positive signal $\overline{DO}$ because the storage register 112 has reached its zero setting. The inverted error signal $\overline{ERROR}$ enables the last input to the gate 724. When the gate 724 is fully enabled, its output drops to a low level, and this signal is effective through a NAND gate 730 to apply a more positive potential to one of the J inputs to a minus or negative quantity flip-flop 732. When the next clock pulse is applied to the clock terminal of the flip-flop 732, this flip-flop is set so that the signal MFF rises to a more positive potential and the inverted signal $\overline{MFF}$ drops to a low level.

Since the storage register 112 is now in its reset condition, further input pulses must be used to drive this register in a forward direction to accumulate the negative quantity. Thus, the inverted signal $\overline{MFF}$ applies an inhibit to one input of the gate 752 to drive the output of this gate toward a more positive potential. Since the add flip-flop 706 has not been set, the signal AD is at a low level, and the gate 750 is driven to supply a more positive potential at its output. Further, since the subtract flip-flop 720 is set and the minus flip-flop 732 is set, both inputs to a gate 740 are enabled, and the output of this gate drops to a more negative potential to drive the output of the gate 742 toward a more positive potential. This positive potential is effective through the amplifier 744 to provide a more positive potential to the forward counting terminal UP of the storage register 112. This potential is also effective through the inverter 746 and the amplifier 748 to apply a more negative potential to the down counting terminal DN. Thus, the storage register 112 is conditioned for operation in its forward or up direction.

To provide a visible indication that a minus quantity is being entered into the storage register 112, when the first count pulse is applied to the terminal CT of the storage register 112 and this first count is registered therein, the signal $\overline{DO}$ rises to a more positive potential and completes the enabling of a gate 734, the other input of which is supplied with the signal MFF. The low output of the gate 734 is effective through the amplifier 736 to illuminate a lamp 738 (FIGS. 2 and 7). The illuminated lamp 738 provides a visual indication that a negative quantity is being transferred into the storage register 112 and displayed by the digital display unit 114. In addition, the more positive signal MFF is supplied to one input of a NAND gate 1127 (FIG. 11) which is enabled by the steering signal SE8 to record a bit having the binary weight "8" in this position in the output recording cycle to indicate to the data processing unit that the following quantity is a negative quantity.

At the conclusion of the transfer of the quantity from the keyboard register 106 to the storage register 112 which resulted in the establishment of a negative quantity, the restoration of the keyboard register 106 to its normal setting drops the inverted signal $\overline{ADO}$ to its low level and effects the resetting of the subtract flip-flop 720 in the manner described above. The negative quantity flip-flop 732 remains in its set condition to provide the continued illumination of the minus lamp 738 and the marking for the output steering circuit 118 afforded by the more positive signal MFF.

Assuming, however, that the operator now desires to add a positive quantity through the keyboard register 106 to the storage register 112, this quantity is transferred from the keyboard unit 108 into the keyboard register 106 in the manner described above, and the add switch 108C is momentarily operated to set the add flip-flop 706 in the manner described above. Since a positive quantity from the keyboard register 106 is to be added to the negative quantity standing in the storage register 112, the storage register 112 must be operated in a reverse or down direction. To accomplish this, the signal SU is low because the subtract flip-flop 720 is not set, and the output of the gate 740 is more positive. The inverted signal $\overline{DO}$ is positive because a bit is stored in the storage register 112. The inverted negative signal $\overline{MFF}$ is negative and applies an inhibit to the gates 741 and 756. Thus, all the inputs to the gate 742 are at a more positive level, and this gate is fully enabled. Similarly, the gate 750 is fully enabled because all of the signals AD, MFF, and $\overline{DO}$ are at a more positive level. The two gates 742 and 750 pull the output of the gate 752 to a low level so that the up counting terminal UP of the storage register 112 is inhibited, and the reverse counting terminal DN is enabled. Thus, the signals CDA and $\overline{CDA}$ supplied by the gate 710 which was enabled by the setting of the flip-flop 706 are effective to operate the count down circuit of the storage register 112 to enter the positive quantity in the keyboard register 106 by reducing the value standing in the storage register 112.

If the value to be transferred from the keyboard register 106 to the storage register 112 is greater than the value standing in the register 112, the value standing in the register 112 will reach zero during the transfer operation. At this time, the inverted signal $\overline{DO}$ drops to a low level and prepares a circuit for resetting the negative quantity flip-flop 732. One of the J inputs to the flip-flop 732 is held at a more negative potential by the gate 730 because an inhibit is applied to each of the gate 724 and 728.

However, the more positive signal DO enables one input to each of two NAND gates 764 and 768. The other input to the gate 768 is enabled by the signal AD since the add flip-flop 706 is set, and the other input of the gate 764 is enabled by the inverted subtract signal $\overline{SU}$ because the subtract flip-flop 720 is not set. The remaining input to the gate 764 is enabled by an inverter 762, the input of which is connected to a low level potential through a pair of normally closed contacts 212A on the negative takeoff switch 212. Thus, the outputs of both of the gates 764 and 768 drop to a low level potential and are effective through a NAND gate 766 to apply a more positive potential to one of the K inputs to the flip-flop 732. Thus, the next clock pulse resets the flip-flop 732. The resetting of the flip-flop 732 is effective with the change in the level of the inverted signal $\overline{DO}$ to apply an inhibit to the gate 734 to terminate the energization of the lamp 738 through the amplifier 736. Thus, the visible indication of the negative quantity is removed.

In addition, the counting direction of the storage register 112 must be reversed from down to up since a positive quantity is being entered. This is accomplished through the change in the level of the signals MFF and $\overline{MFF}$. More specifically, the signal MFF is at a low level and applies one inhibit to the gate 750. The signal SU is at a low level and applies one inhibit to the gate 752. The signals AD and $\overline{MFF}$ fully enable the gate 741 so that one inhibit is applied to the gate 742. Thus, the potentials applied to the terminals UP and DN of the register 112 are reversed, and this register now counts in a positive direction until the value has been transferred from the keyboard register 106. When the keyboard register 106 arrives at its zero setting, the inverted signal $\overline{ADO}$ drops to a low level, and the add flip-flop 706 is reset in the manner described above to terminate the transfer of data from the register 106 to the register 112.

When the operator is satisfied that the proper quantity relating to the area and material specified by the actuated keys in the groups 230, 240, 250, 260, and 270 is present in the storage register 112 as visually indicated by the digital display unit 114, this quantity is entered by momentarily actuating the enter key 210 to momentarily close the contacts 210A in the output control circuit 116 (FIG. 9). This produces the signals EO and $\overline{EO}$ in the manner described above and starts a cycle of recording operation.

This operation is the same as that described above when the estimate number is entered except that the cue switch flip-flop 920 has been reset in the manner described above and the signal OFF is at a low level. Thus, the signal EO does not enable the gate 972, and the counter 968 is not primed to a setting in which the signal SE11 is positive. Thus, the decoding circuit 970 with the counter reset provides a positive enabling signal SEO and the first item of information recorded during the recoding cycle is the value of the first digit of the designation of the selected area afforded by the closed contacts 232A (FIG. 11).

Thus, as the counter 968 is advanced in the manner described above to control the decoding circuit 970 to supply the signals SE0–SE15 in sequence, all of the data entered through the console and console and stored in the storage register 112 is supplied in sequence to the punch control units 1110–1115 in the manner described above. Further, in the event that a negative quantity is stored in the storage register 112, the signal MFF is present to complete the enabling of the gate 1127, and a bit of a binary weight "8" is recorded by the punch control 1113 in the step in the output recording sequence determined by the enabling signal SE8.

At the conclusion of the recording cycle, the output steering circuit 118 and the output control circuit 116 are restored to their normal condition as described above, and the storage register 112 is cleared and reset.

Entering a Data Item Using The Detector Input Circuit 124

When the detector input circuit 124 is used to effect the storage of a quantity in the storage register 112, the area, category, and subcategory information is set up on the console of the system 100 in the same manner as when quantity information is entered through the keyboard 108. When the footage or wheel unit 128 is used, it is necessary to set the scale selecting switch 226 in accordance with the scale of the drawings. When the item detector 126 is used, it is not necessary to adjust the scale selecting switch 226. The only thing required to enable the use of the item detector 126 is the selection of a category in which the quantity represents a number of items so that the quantity entered into the storage register 112 represents a number of the items or material. On the other hand, if the rolling contact detector 128 in used, the quantity entered into the storage register 112 generally represents the quantity of material in a unit of linear measure, such as feet.

As set forth above, the inverted signal $\overline{ON}$ developed when the system 100 is initially energized clears the system and primes it into its initial operating condition. This signal also generates the reset signal $\overline{RSI}$ (FIG. 6) which is used in the detector input circuit 124 to reset a plurality of flip-flops 640, 646, and 676 and to reset a divide by three counter 678. The resetting of the flip-flop 646 also resets a five-stage binary counter 648 and also applies an inhibit to the input of this counter which is supplied with the clock signal C. After the estimate number has been entered to remove the inhibits described above which prevent an input from the detector input circuit 124 and assuming that a category is selected which permits the use of the item probe 126, the detector input circuit 124 is in condition for use under the control of the probe 126 to enter a quantity or number of items in the storage register 112. In general, the detector input circuit 124 supplies a positive-going signal GP at the output of a NAND gate 690 which is forwarded to and through the input control circuit 110 to the input of the storage register 112 for each increment of value to be added. The signal GP is developed not only by the gate 690 but also under the control of two additional NAND gates 691 and 692 connected to the expander input of the gate 690.

The operator then presses the probe 126 against each item on the blueprint or other graphic original so that the total number of such items is accumulated in the storage register 112. More specifically, when the probe 126 is placed against the graphic original, a pair of contacts 126A (FIG. 6) are momentarily closed to provide a more negative potential to the input of a monostable timing circuit 630. This circuit supplies a positive-going pulse of a selected duration to one input of a NAND gate 632, the other input of which is open. Thus, the NAND gate 632 is fully enabled to provide a more negative output signal which is forwarded to a control circuit 634 to operate an audible signal 636. This audible signal provides an indication to the operator that the probe 126 has been actuated. The more negative potential provided at the output of the gate 632 is also applied to one input of the gate 690 and drives the output of this gate to a more positive potential to provide the signal GP.

This signal is supplied to one input of the NAND gate 728 in the input control circuit 110 and input of the NAND gate 728. The signal applied to the gate 728 is without function at this time. However, the gates 776 and 780 are fully enabled because the system 100 is not in a resetting or recording cycle. Further, since the keyboard register 106 does not contain an entry, the signal ADO is at a more positive potential, and the signal $\overline{OFF}$ is at a more positive potential because the estimate number has been entered and the cue switch flip-flop 920 has been reset. The error signal $\overline{ERROR}$ is also positive. Thus, the signal GP completes the enabling of the gate 728, and the output of this gate drops to a more negative potential which is applied to one input of the gate 784. Since the gate 710 has not been enabled because an entry is not being transferred from the keyboard register 106, the signal $\overline{CDA}$ is at a more positive level, and the signal supplied by the gate 782 controls the gate 784 to provide a more positive count signal to the input terminal CT of the first stage 870 in the storage register 112.

At this time, the forward counting control terminal UP of the storage register 112 is provided with a more positive enabling signal, and the reverse counting terminal DN is provided with a more negative inhibiting signal. More specifically, since neither of the flip-flops 706 and 720 are set, the signals AD and SU are at a low level, and the gates 750 and 752 provide a more positive output. Further, since no values are now stored in the storage register 112, the signal $\overline{DO}$ is at a low level, and the output from the gate 742 are at a high level. In addition, the negative quantity flip-flop 732 reset, both of the inputs to the gate 756 are fully enabled, and the output of this gate applies a further inhibit to the gate 742 to hold the output of this gate at a high level when a single bit has been stored in the storage register 112, and the signal $\overline{\text{DO}}$ rises to a more positive potential. As set forth above, this high level potential at the output of the gates 742, 750, and 752 enables the storage register 112 to count in a positive direction and inhibits counting operation of this register in a reverse direction.

Accordingly, the count pulse developed at the output of the gate 784 increments the value stored in the storage register 112, and each time that the probe 126 actuated, the register 112 increases in value by an increment of one. In this manner, successive operation of the probe or input detector 126 accumulates the total number of items in the storage register 112. When the item count has been completed, the operator actuates the enter key 210 to control the output control circuit 116 and the output steering circuit 1118 to transfer the quantity stored in the register circuit 112 to the output recorder 102 in conjunction with the identifying information established by the manual selector input 120.

Figure 6:
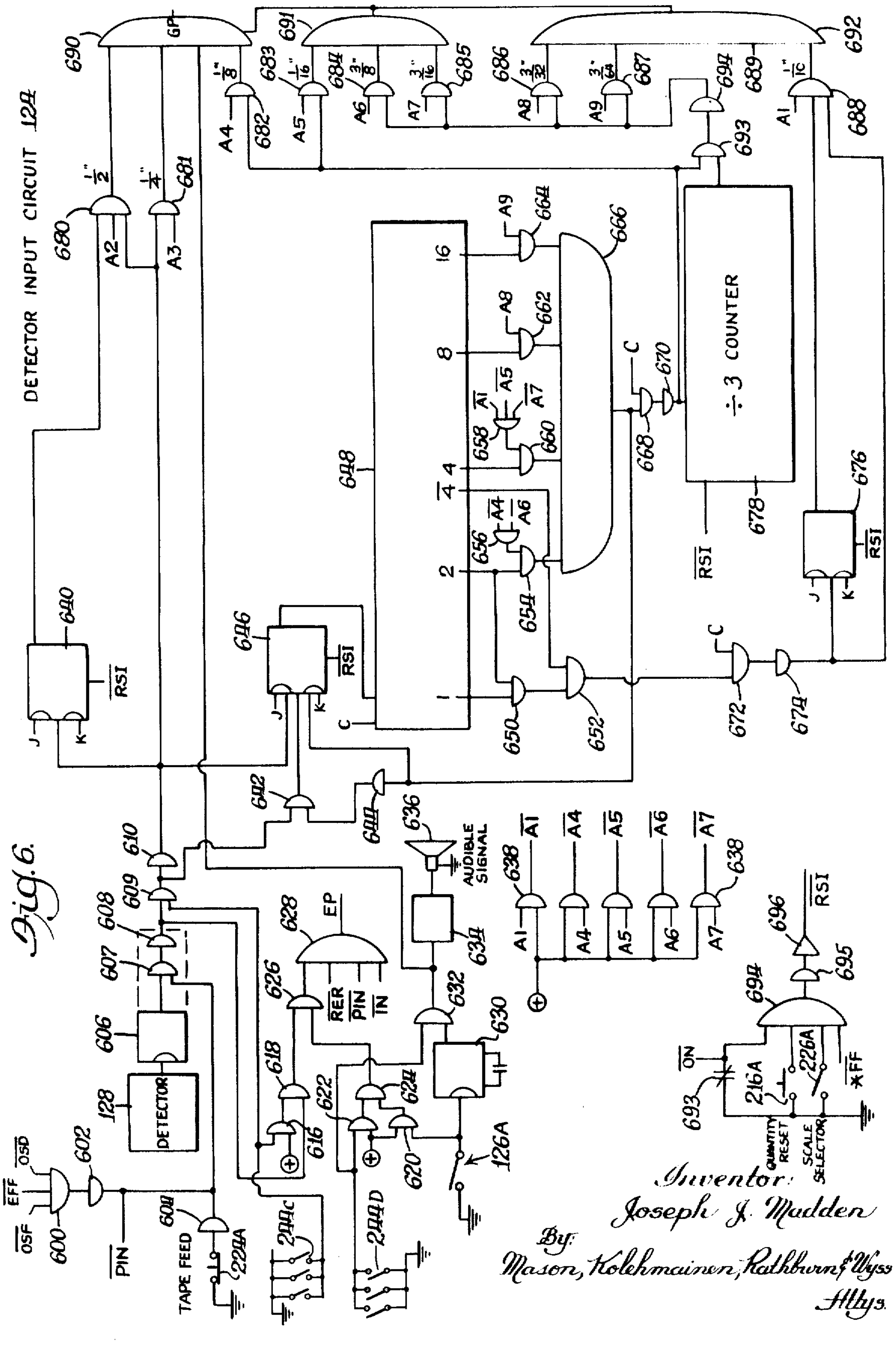
FIG. 6 is a circuit diagram of a detector input circuit.

Some of the categories that can be selected by the operator are categories in which item counting is not permitted. An example is a category in which the quantity in the storage register 112 must represent, for instance, a running length of a material. Whenever one of these categories is selected by the operator by manual actuation of one of the keys 244, the actuation of the key also closes a related one of a plurality of normally open contacts 244D (FIG. 6). The closure of the contact 244D applies a low level inhibiting potential to one input of a NAND gate 622 and to one input of the gate 632. Accordingly, when the contacts 126A are momentarily closed by operation of the item probe 126, the timing circuit 630 is again operated to provide a more positive signal at its output. However, one input to the gate 632 is inhibited, and the output of this gate is held at a more positive potential to prevent actuation of either the audible signal 636 or the generation of the output pulse or signal GP.

The momentary closure of the contacts 126A also enters an error indication into the system 100. More specifically, the low level signal supplied by the momentarily closed contacts 126A applies an inhibit to one input of a NAND gate 620. The more positive output from the two inhibited gates 620 and 622 fully enable a NAND gate 624 so that a more negative potential is applied to one input of an NAND gate 626. This drives the output of the gate 626 to a more positive potential and completes the enabling of a NAND gate 628 so that an output signal EP therefrom drops to a lower level. The gate 628 is fully enabled by the signal from the gate 626 because the signals $\overline{\text{RER}}$, $\overline{\text{PIN}}$, and $\overline{\text{IN}}$ are all at a more positive level inasmuch as a resetting operation or recording cycle is not being performed.

The signal EP is applied to the prime or preset input of a flip-flop 1200 (FIG. 12) to set this flip-flop. When the flip-flop 1200 is set, the signal $\overline{\text{ERROR}}$ drops to a low level, and the high level signal is applied to a control circuit 1204 through an inverter 1202 to cause the energization of a buzzer or other audible alarm 1208 and the illumination of an error reset lamp 1206. This provides a more visible and audible indication that an error has occurred and that the system must be reset.

This resetting is accomplished by momentarily actuating the error reset key 108A to provide the resetting signal $\overline{\text{RER}}$. The low level signal provided by the momentary closure of the contacts 108A also resets the flip-flop 1200 to terminate the operation of the lamp 1206 and the buzzer 1208 and to return the error signal $\overline{\text{ERROR}}$ to a positive level. During the persistence of the signal $\overline{\text{ERROR}}$ at its low level, an inhibit is supplied to the output gate 782 in the input control circuit 110 (FIG. 7) to prevent the transmission of any input signals to the storage register 112. This signal also applies an inhibit to the two gates 724 and 728 which are used to control the setting of the minus flip-flop 732. As illustrated in FIG. 6, the reset signal $\overline{\text{RER}}$ is applied to one input of the gate 628 to apply an inhibit to this gate and terminate the signal EP.

If the operator desires to use the rolling contact detector 128 to provide an input through the detector input circuit 124 to the storage register 112, the manual selector inputs 120 are actuated in the manner set forth above to provide the area and material identifying information. In the selection of the category of materials, a material must be selected which is capable of being expressed in linear dimension to enable the use of the rolling contact detector 128. Further, the scale selecting switch 226 must be adjusted to a position corresponding to the scale of a drawing with which the detector 128 is to be used.

The scale selector 226 consists of a nine position switch which shorts to ground all of the contact points except the selected point. In FIG. 6 of the drawings, the signals developed by the switch 226 in its various settings are designated as A1–A9, and the scale or significance of these signals is represented by the legends appearing adjacent the one of the gates 680–688 to which the signals A1–A9 are supplied. As an example, the gate 680 is supplied with the signal A2 and represents a drawing scale of ½-inch for each foot of linear measure. The signal A2 is at a low level or a ground potential when the scale selecting switch 226 is adjusted to any setting except the ½-inch setting. When the switch 226 is set to the ½-inch setting, the input to the gate 680 supplied with the signal A2 is left floating and internally has the effect of being coupled to a more positive potential. The detector 128 can be of any suitable construction, but in the illustrated system supplies a negative-going output pulse to the input of a monostable timer 606 for each quarter inch of relative movement between the detector and the graphic original or blueprint.

When the timing circuit 606 is triggered, a more positive pulse of suitable selected duration is supplied to one input of a NAND gate 607, the other input of which is normally enabled by the inverted signal $\overline{\text{PIN}}$. The low level signal from the gate 607 is forwarded through an inverter 608 to the input of a NAND gate 609, the other input of which is normally enabled. The low level output from the NAND gate 609 is forwarded through an inverter 610 to provide pulses for controlling the generation of the input signals GP in accordance with the setting of the scale selecting switch 226.

Assuming that the scale selector is set to the ¼-inch scale so that each pulse developed by the timing circuit 606 under the control of the detector 128 represents a foot of linear measure, all of the gates 680–688 are inhibited except the gate 681. This gate is fully enabled by the positive pulse developed at the output of the inverter 610 and provides a more negative input to the gate 690 so that this gate develops the signal GP. The signal GP is applied to the input of the storage register 112 through the gates 782 and 784 (FIG. 7) in the manner described above. Thus, the detector 128 is rolled over a blueprint, the value standing in the storage register 112 is increased by an increment of one, representing 1 foot of linear length for each quarter-inch of movement of the detector 128 relative to the blueprint. When the measuring has been completed, the value standing in the storage register 112 is transferred to the output recorder 102 in conjunction with the identifying information derived from the manual selector input 120 by depressing the enter key 210. This recording operation is preformed in the same manner described above.

Assuming that for some reason such as the fact that two items of identical length but different characteristics within the same category are to be successively entered into the system 100, the system 100 includes means for preserving the quantity stored in the storage register 112 and preventing the clearing of this register incident to an output recording operation. This is accomplished by manually depressing the hold quantity switch 214 and permits the operator to change one of the subcategories and then actuate the enter switch to transfer the same quantity in the system 100 with a different designation. For example, if two different types of wire are to be laid in the same conduit, the operator need only establish the length of the conduit or wire, depress the hold quantity key 214, enter the quantity by actuation of the enter key 210, then change the selected subcategory, and reenter the quantity by again actuating the enter key 210. The hold quantity operation can be cleared at any time by actuation of the reset key 216 after release of the hold quantity key 214.

When the hold quantity key 214 which is preferably a locking-type key is actuated, a pair of normally open contacts 214A are closed, and two pairs of normally closed contacts 214B and 214C are opened. The closure of the contacts 214A illuminates a lamp 771 which can provide back lighting for the hold quantity key 214 to provide a visual indication that the storage register 112 is not to be cleared incident to the resetting operation. The opening of the contacts 214C prevents the generation of the resetting signal $\overline{RS}$ under the control of a pair of normally open contacts 216B on the reset key 216. The opening of the contacts 214B interrupts the above-described circuit by which the flip-flop 980 (FIG. 9) normally controls the gate 770 to provide a reset signal $\overline{RS}$ incident to the completion of each cycle of operation of the output recorder 102. When the quantity is no longer desired, the hold quantity key 214 can be released and the reset key 216 momentarily actuated. The momentary actuation of the reset key 216 closes two pairs of normally open contacts 216A and 216B. The closure of the contacts 216A (FIG. 6) controls the development of the reset signal $\overline{RSI}$ to reset the detector input circuit 124. The closure of the contacts 216B controls the development of the reset signal $\overline{RS}$ to reset the storage register 112 in the input control circuit 110.

The system 100 also includes means by which the operation of the rolling contact detector 128 or the item detector 126 can be used to reduce the value of the quantity stored in the storage register 112. To accomplish this, the negative takeoff key 212, which preferably is a locking key which is released by reactuation of the key, is operated to open the normally closed contacts 212A and close a pair of normally open contacts 212B (FIG. 7). The closure of the contacts 212B illuminates a lamp 760 which may provide back lighting for the legend on the key 212 to indicate its actuation. The opening of the contacts 212A removes various inhibits and applies various enabling signals to the input control circuit 110. These enables and inhibits control the setting and resetting of the negative quantity flip-flop 732 during an input from the detector input circuit 124 and also control the direction of counting in the storage register 112.

Assuming that a positive value is standing in the storage register 112 and the negative takeoff key 212 is actuated to permit the operator to reduce the value standing therein using one of the detectors 126 or 128, the opening of the contacts 212A completes the enabling of the gate 754 (FIG. 7) so that its output drops to a more negative potential to drive the outputs of the gates 756 and 758 to a more positive potential. Since neither add nor subtract operations are being performed, the flip-flops 706 and 720 are reset to apply inhibits to one input of the gates 740 and 741 so that the outputs of these gates are at a more positive potential. Since a value is stored in the storage register 112, the signal $\overline{DO}$ is also at a more positive potential. Thus, the output of the gate 742 drops to a low level and pulls the outputs of the gates 750 and 752 which would normally be at a high level to this low level. As set forth above, this low level potential at the input of the driver amplifier 744 and the inverter 746 conditions the storage register 112 for counting in its reverse direction. Thus, any count signals GP developed by either of the probes 126 and 128 results in reducing the quantity stored in the storage register 112.

Assuming that the number of signals GP supplied by the detector input circuit 124 equals the value stored in the storage register 112, this register is reset by these pulses to its normal condition and the signal $\overline{DO}$ drops to a low value. When this happens, the outputs of all of the gates 742, 750, and 752 rise to a more positive potential, and the storage register 112 is conditioned for counting in its forward direction. When the next signal arises representing the first increment of negative value, the gate 728 is fully enabled so that its output drops to a low level and is effective through the gate 730 to provide a more positive J input to the negative quantity flip-flop 732. Thus, the next clock signal C applied to the flip-flop 732 sets this flip-flop to again illuminate the minus lamp 738. This provides a visual indication that a negative quantity is now stored in the storage register 112.

When this first pulse GP is supplied to the storage register 112 to register a count therein, the signal $\overline{DO}$ again rises to its high level to inhibit the gate 728. Further, the signal $\overline{DO}$ no longer applies an inhibit to the gate 742. However, when the flip-flop 732 is set, its inverted output signal $\overline{MFF}$ drops to a low potential to apply an inhibit to the gate 754. Thus, the output of this gate rises to a more positive potential, and both inputs to the gate 78 are enabled. Thus, the output of this gate drops to provide an inhibit to the lower input to the gate 742, and the output potential from this gate remains high so that the counter providing the storage register 112 continues to operate in its up or forward direction.

The negative takeoff from the prints using one of the detectors 126 and 128 can continue until completed with the result that a negative quantity is standing in the storage register 112. This negative quantity can be recorded by actuating the enter button 210 in the manner described above. Since the minus flip-flop 732 is set, by a binary "8" is recorded in the position defined by the steering signal SE8 to provide an indication to the computer that a negative quantity has been recorded. Alternatively, the negative takeoff key can be released to open the contacts 212B and to close the contacts 212A and the negative quantity can be reduced or converted to a positive quantity making entries either through the detector input circuit 124 or the key board unit 108. If the quantity added by either of these means is greater than the negative value standing in the storage register 112, the gates 764, 766, and 768 reset the negative quantity flip-flop 732 in the manner described above when the storage register 112 passes through its zero setting.

Referring now more specifically to the detector input circuit 124, in the preceding illustrative example in which the selected scale is the quarter-inch scale, the detector 128 and the timing circuit 606 provide a single pulse for each quarter-inch of movement, and the output of the timing circuit 506 can be used directly through the gate 681 to provide the signal GP which changes the setting of the storage register 112 a single increment indicating a change in linear distance of 1 foot. If, however, the selected scale is one-half inch, a signal GP should be generated only in response to the receipt of two pulses from the detector 128. Thus, when the one-half inch scale is selected, the gate 680 is partially enabled. One other input to the gate 680 is connected to the output of the inverter 610, and the other input to this gate is connected to the true output of a flip-flop 640 which is reset whenever the detector input circuit 124 is placed in use. In addition, it should be noted that the scale selector switch 226 includes a pair of normally open contacts 226A which are momentarily closed whenever the setting of this switch is varied. The momentary closure of the contacts 226A is effective through the gate 694 to generate the resetting signal $\overline{RSI}$ and clear the detector input circuit 124 each that the selector switch 226 is operated.

Thus, wit— the flip-flop 640 reset at the beginning of the operation in which the one-half scale is selected, the first pulse received from the timing circuit 606, on its tailing edge, toggles the flip-flop 640 to a state in which its output to the gate 680 is at a more positive potential. Thus, when the second output from the detector is received and the output from the inverter 610 goes positive, the gate 680 is fully enabled to control the gate 690 to develop the count pulse GP. The trailing edge of this pulse toggles the flip-flop 640 back to its reset condition. The third pulse sets the flip-flop 640 on its trailing edge, and the fourth pulse again enables the gate 680 to develop a second output pulse. Thus, for each two input signals received from the wheel detector, the gates 680 and 690 provide a single output pulse representing an increment of one foot of running length.

To provide proper numbers of pulses related to the scales shown adjacent the remaining gates 682–688, it is necessary to use signals derived using the two flip-flops 646 and 676 and the counters 648 and 678. In addition, this circuit requires the provision of the inverted signals $\overline{A1}$ and $\overline{A4}$–$\overline{A7}$ which are developed from the true signals using a plurality of NAND gates 638. If, for instance, the one-tenth inch scale is to be used, the input to the gate 638 provided by this signal is opened, and the gate 638 is enabled to provide a low level inverted signal $\overline{A1}$.

The detector input circuit for the one-eighth inch scale provides two signals GP for each signal from the detector 128. The circuit must provide four signals GP for each detector signal for the one-sixteenth inch scale and two signals GP for each three detector signals for the three-eighths inch scale. For the three-sixteenths inch scale, the circuit provides four signals GP for each three detector signals, and thus provides eight signals GP for each of the three detector signals for the three thirty-seconds inch scale. For the three sixty-fourths inch scale, it provides 16 signals GP for each three detector signals. For the one-tenth inch scale, the circuit 124 provides five signals GP for each two detector signals. In general, this is performed in the input circuit 124 by using the counter 648 to provide a means for multiplying each detector pulse to the desired number of output pulses and by using the divide by three counter 678 and the flip-flop 676 to establish the ratio between the detector pulses and output pulses where the ratio is not unity.

As an example, assuming that the scale selector switch 226 is set to its one-eight inch scale where two signals GP must be provided for each detector signal, the gate 682 is partially enabled by the removal of the signal A4, and the signal $\overline{A4}$ is at a low level to drive the output of a NAND gate 656 to a high level. This potential is applied to one input of NAND gate 654. This gate and three additional gates 660, 662, and 664 provide inputs to a NAND gate 666. Since the counter 648 is set, all of the true outputs are at a low level, and the gate 666 is fully enabled through the gates 654, 660, 662, and 664. Accordingly, the output of the gate 666 is at a low level which is applied to one of the K inputs of the flip-flop 646. This signal is also applied through an inverter 644 to one input of a NAND gate 642, the other input of which is coupled to the output of the NAND gate 609.

Accordingly, when the first detector pulse is provided, the more negative signal at the output of the NAND gate 609 drives the output of the gate 642 to a more positive potential during which the more positive potential from the output of the inverter 610 is read into the J input of the flip-flop 646. AT the conclusion of the detector pulse, the gate 642 is fully enabled, and its output drops to a low level to toggle the flip-flop 646. When the flip-flop 646 is toggled, the input inhibit to the counter 648 is removed and this counter is responsive to the clock signal C. The first clock signal drives the "1" output positive, and the second clock signal drops the "1" output to a low level and places the "2" output at a high level. This fully enables the gate 654 to that its output drops to a low level and applies an inhibit to the gate 666 so that its output rises to a more positive potential.

This more positive potential is applied to a K input of the flip-flop 646 and is effective through the inverter 644 to drive the output of the gate 642 tor a more positive level to read in the input signals to the flip-flop 646, the J input to this flip-flop being at a low level at the output of the inverter 610.

When the output of the gate 666 rises to a more positive potential, one input to a NAND gate 668 is enabled so that the next two clock pulses are coupled through this gate and an inverter 670 to be applied to one input of each of the two gates 682 and 683. The gate 683 is inhibited. However, the gate 682 for the one-eighth inch scale is enabled and the two clock pulses are repeated through this gate and the gate 690 to provide two count signals GP. It should be noted that these signals are developed off the positive-going leading edge of the clock signal C.

These two clock signals which result in the two output signals GP also advance the counter 648 so that on the trailing edge of the last of these two pulses, the "4" output rises to a more positive potential and the "2" output drops to a more negative potential. This controls the gate 654 to complete the enabling of the gate 666 so that its output drops to a more negative potential. This signal is effective through the inverter 644 to complete the enabling of the gate 642 so that the flip-flop 646 is toggled to its reset condition. The low level output signal from the flip-flop 646 inhibits the input so that the counter 648 cannot be advanced by the clock signal C and also resets this counter to its normal condition. The circuit remains in this condition until the next detector pulse is received. Thus, for each signal received from the detector 128, the gate 682 provides two output signals GP.

Substantially the same operation is performed when the one-sixteenth inch scale setting is selected by the switch 226 and the gate 683. The gate 683 is partially enabled by the absence of the signal A5, and the inverted signal $\overline{A5}$ enables one input to a gate 660, the other input of which is connected to the output terminal "4" from the counter 648. When an input signal from the detector 128 is received with the scale selecting switch 226 in this condition, the counter 648 counts to four and an inhibit is applied to one input of the gate 666 by the gate 660. This partially enables the age 668 so that the next four clock pulses are applied through the gate 683 to the gate 691 to provide four output signals GP. On the trailing edge of the last of the four pulses, the gate 666 is again fully enabled and the flip-flop 646 is reset.

To illustrate the operation of the circuit 124 when the ratio between the detector pulses and output pulses GP is not unity, it is assumed that the selector switch 226 is adjusted to its setting for the three-eights inch scale in which the gate 648 is enabled by the absence of the signal A6. The inverted signal $\overline{A6}$ is applied to one input of the gate 656 and is effective in the manner described above to control the counter 648 and the gate 666 to pass two clock pulses through the gate 668 and the inverter 670 for each detector input pulse. These two pulses are not, however, directly applied to the gate 648. They are applied to one input of a NAND gate 693, the other input of which is supplied by the output of the divide by three counter. The two clock pulses from the inverter 670 are also supplied to the divide by three counter. Thus, the first two clock pulses developed by the first detector pulse advance the divide by three counter 678 through two steps. During the second group of two clock pulses produced by the second detector pulse, the counter 678 is advanced through one step, the gate 693 is enabled for one clock pulse which is forwarded through an inverter 694, and the gates 648 and 691 to provide one output pulse GP, and the second of these two pulses advances the divide by three counter to its first position in which the gate 693 is again inhibited. The next group of two pulses produced by a detector input signal advances the divide by three counter 678 through two additional steps so that the gate 693 is enabled to pass one of these two clock pulses to provide a second output signal GP. Thus, the three detector input signals result in the generation of two output signals Gp.

In a similar manner, in the three-sixteenths inch, three thirty-seconds inch, and three sixty-fourths inch scale settings in which the signals A7, A8, and A9 are used, the counter 648 generates four, eight, and 16 pulses, respectively which advance the divide by three counter 678 to selectively enable the gate 693 so that four, eight, and 16 output signals GP are provided for each three detector input signals In this connection, it should be noted that the gate 662 inhibits the gate 666 to allow clock pulses to pass after eight pulses have been received and returns the gate 666 to a fully enabled condition after eight additional clock pulses have been coupled through the gate 668 when the three thirty-seconds inch scale is selected. The gate 664 inhibits the gate 666 at the end of one cycle of operation of the counter 648 and restores the full enabling of the gate 666 when the counter 648 has been operated through another full cycle of operation, thereby providing the 16 clock signals used with the three sixty-fourths inch scale.

With regard to the one-tenth inch scale which enables the gate 688 by removing the signal A1, a pair of gates 650 and 652 and the gate 658 which has a signal $\overline{A1}$ input selectively enable a NAND gate 672 to which the clock signals C are applied to permit five clock pulses to be applied to one input of the gate 688 through an inverter 674 for each detector input signal. These groups of five pulses are also applied to the clock input of the flip-flop 676, the output of which is connected to another input of the gate 688. The flip-flop 676 provides a division by two so that for each ten pulses applied to this flip-flop an to the gate 688, the gate 688 will be enabled for only half of these pulses. Thus, for each two detector pulses each providing a group of five clock pulses, only five clock pulses in total will be coupled through the gates 688 and 692 to provide five output signals GP.

The detector input circuit 124 also includes means for providing an alarm indication and for inhibiting the development of an output signal GP in the event that the operator has selected a category in which the rolling contact detector 128 should not be used. On each of the switches 244 wherein the rolling contact detector cannot be used, there is a pair of normally open contacts 244C. The closure of one of these contacts when a category is selected which does not permit the use of the rolling contact detector 128 forwards a low level potential to one input of the NAND gate 609. This prevents the development of an output signal from the time pulse generator 606.

To provide a visible and audible indication of the improper operating condition, the low level signal from the closed contact 244C is applied to one input of a NAND gate 616 to drive the output of this gate to a more positive level. When an attempt is made to use the detector 128, the output of the inverter 608 and the output of he gate 616 fully enable a NAND gate 618 to that its output drops to a low level. This low level signal is effective through the gate 626 to complete the enabling of the gate 628. The full enabling of the gate 628 provides the low level signal EP which sets the alarm flip-flop 1200 in the manner described above to illuminate the lamp 106 and to energize the audible indicator or buzzer 1208. These indications can be cleared in the manner described above by actuating the error reset key 108A.

The operation of the rolling contact detector 128 is also inhibited during a recording cycle. As set forth above, whenever a recording cycle is being performed, one of the signals $\overline{OSF}$, $\overline{EFF}$, and $\overline{OSD}$ is at a low level, and the output of a gate 600 rises to a more positive level. This signal is effective through an inverter 602 to provide the inhibiting signals $\overline{PIN}$. This signal is also effective to inhibit one input to the gate 607 to prevent the development of output pulses from the rolling contact detector 128.

The operation of the rolling contact detector 128 is also inhibited whenever a manual tape feed operation is performed. More specifically, when it is desired to manually control the tape feeding operation, the tape feed switch 224 is actuated to open a pair of normally closed contacts 224A so that an inverter 604 provides a low level inhibit for the gate 607 and the low level inhibiting signal $\overline{PIN}$.

In addition, the actuation of the tape feed switch 224 opens a pair of normally closed contacts 224B in a tape feed control circuit illustrated in FIG. 14 of the drawings. The opening of the contacts 224B removes an inhibit from one input to a NAND gate 1400. The other input to the gate 1400 is normally provided with a more positive potential, and the gate 1400 is thus fully enabled to provide a low level potential at its output. The output of the gate 1400 is connected to one input to a NAND gate 1402, the output of which is connected to a clutch control circuit 1404. The inhibit applied to the gate 1402 drives the output of the gate 1402 to a high level and operates the clutch control 1404 to engage mechanism for advancing the tape in the recorder 102 until such time as the tape feed switch is released.

The other input to the gate 1402 is supplied with the signal $\overline{OSF}$. As set forth above, this signal drops to a low level incident to each step of operation of the output steering circuit 118 and thus affords means for intermittently actuating the clutch control 1404 each time that an entry is punched in the tape. The clutch mechanism can comprise, for example, a 1-revolution clutch so that the short duration signal $\overline{OSF}$ merely disengages the clutch, and a full feeding operation takes place incident to each punching cycle, even through the signal $\overline{OSF}$ has disappeared. When the tape feed switch 224 is actuated to open the contacts 224B, the enabling signal for the clutch control 1404 persists for so long as the switch is held open and continuous advance of the tape in the output recorder 102 is obtained.

The clutch control circuit shown in FIG. 14 also includes means for disabling feeding of the record medium in the recorder 102 and for providing a visual indication that the tape feeding mechanism is not in proper operating condition. More specifically, associated with the reels of tape are one or more normally open switches 1410 which are closed when the reels are in proper position in the recorder. If the reels are not in proper position, a pair of contacts 1416 applies an inhibit to one input of the gate 1400 and completes an energizing circuit for a relay winding 1406 which closes a pair of normally open contacts 1408. This illuminates a lamp 222A to back light the tape not ready indicator 222. This provides a visual indication through the operator that the output recorder 102 is not in proper operation.

However, when the reels are properly positioned in the recorder 102, the switch 1410 is closed to energize and operate a relay 1412 to open the normally closed contacts 1416. This terminates the energization of the winding of 1406 so that the lamp 222A is not longer illuminated. In addition, the opening of the contacts 1416 removes the inhibit from the gate 1400 so that it can be controlled by the tape feed switch 224.

The system 100 also includes means for effecting an entry in the output recorder 102 which has the effect when the tape from the recorder 102 is used in the central data processor of clearing or cancelling all previously entered quantities for the area, category, and subcategory identified by the codes on the tape accompanying the code delete message. This operation is effected by entering into the console of the system 100 the area, category, and subcategory identifying information using the key banks 230, 240, 250, 260, and 270 in the manner described above. The operator then actuates the delete key 204 (FIG. 2) to momentarily close a pair of normally open contacts 204A (FIG. 13) in a code delete circuit 1300.

The contacts 204A are connected to one input of a NAND gate 1306, the other input of which is supplied with the steering signal SE14 through an inverter 1304. Since the signal SE14 is at a low level, the inverter 1304 enables the connected input of the gate 1306. Thus, the momentary closure of the contacts 204A sets the flip-flop 1302. This is true because one of the J inputs of this flip-flop is supplied to the more positive signal $\overline{EFF}$ from the output control circuit 116, the flip-flop 950 in the output control circuit 116 (FIG. 9) being reset at this time because a recording cycle is not in progress.

When the flip-flop 1302 is set, a more positive code delete signal CD is applied to one input of the NAND gate 1124 in the output steering circuit 118 (FIG. 11). This gate is now fully enabled, and its low level output is applied to the input of a gate array 110 for the binary "1" punch control 1110 in the position enabled by the steering punch SE8. The more positive signal CD is applied to the input of a control 1308 (FIG. 13) in the delete control to cause the illumination of a lamp 1310. This lamp can be used to back light the delete key 204 (FIG. 2) to indicate that a code delete entry has been made.

The operator then actuates the enter key 210 to place the output control circuit 116 in operation so that the area, category, and subcategory information is recorded in the manner described above. However, in view of the full enabling of the gate 1124 in the output steering circuit 118 (FIG. 11), a bit is recorded in the first channel of the tape in the position defined by the steering out signal SE8. This bit is recognized by the computer as a command to delete all previously entered quantities associated with the identifying information preceding the code delete signal. The output control circuit 116 and the output steering circuit 118 complete the cycle of operation in the manner described above to restore these circuits to their normal state.

The code delete flip-flop 1302 is reset to its normal state toward the end of the punch cycle. MOre specifically, when the output control circuit 116 is placed in operation by the actuation of the enter key 210, the flip-flop 950 (FIG. 9) is set in the manner described above so that the signal $\overline{EFF}$ drops to a more negative potential to apply an inhibit to one of the J inputs to the flip-flop 1302 (FIG. 13). When the steering out signal SE14 becomes more positive toward the end of the output recording cycle, the inverter 1304 (FIG. 13) provides a negative pulse to the input of the gate 1306 which applies a positive-going pulse to the clock input of the flip-flop 1302. The trailing edge of this pulse resets the flip-flop 1302 to terminate the illumination of the lamp 1310 and to remove the enabling signal CD from one input to the gate 1124.

In the event that the code delete key 204 is erroneously actuated to set the flip-flop 1302, this flip-flop can be cleared by momentarily operating a delete reset key 206 (FIG. 2). The operation of the reset key 206 momentarily closes a pair of normally open contacts 206A (FIG. 13) to apply a momentary inhibit to one input of a NAND gate 1312. This drives the output of this gate to a more positive potential which is effective through an inverter 1314 to apply a momentary low level signal to the common reset input to the flip-flop 1302. This resets the flip-flop 1302. The flip-flop 1302 is also reset by the inverted signal $\overline{ON}$ generated when the system is placed in operation.

Entering an End-of-Block Message

Whenever the operator desires to end one session of takeoff for his estimate, he actuates the cue switch 208 to control the system 100 to automatically record an end-of-block entry on the tape in the output recorder 102. This end-of-block message advises the central data processing unit to which the record is supplied that this segment of the estimate data has been entered. When this end-of-block entry is made in the recorder 102, the system 100 is automatically returned to its initial state in which no further data entries can be made into the system 100 until an estimate number is entered by the operator. The end-of-block message includes an end-of-block flag in the position in the output recording sequence defined by the signal SE8 and a checksum character in the position defined by the steering out signal SE15.

The checksum character is provided by a checksum circuit 1000 (FIG. 10) including seven half-adders 1004, 1006, 1008, 1010, 1012, 1014, and 1016 connected into an adder configuration through a plurality of NAND gates 1018, 1022, 1024, 1026, 1028, 2030, 2032 and an inverter 1020. The input half adders 1004, 1006, 1008, and 1010 receive as input signals the signals D1–D4 derived from the outputs of the four gate arrays 1100–1103 (FIG. 11). The signals D1–D4 are positive when, during an output scan, the binary bits "1," "2," "4," and "8," respectively are present. Thus, the adder circuit in the checksum circuit 1100 sums the number of bits of binary significance provided during an output recording cycle.

The outputs from the half adders 1004, 1012, 1014, and 1016 are supplied to and stored in four flip-flops 1044, 1046, 1048, and 1050, respectively. The J and K inputs of these flip-flops are coupled to the sum and inverted sum outputs, respectively, of the indicated half adder circuit. The clock inputs to the flip-flops 1044, !1046, 1048, and 1050 are connected to the output of an NAND gate 1034 through an inverter 1036. These flip-flops are selectively reset under the control of two NAND gates 1038 and 1040 and an inverter 1042. Thus, when the system is placed in operation by the initial actuation of the off-on switch 202, the signal $\overline{ON}$ is generated and is applied to one input of the gate 1040 to drive the output of this gate to a more positive potential which is effective through the inverter 1042 to clear or reset the four output flip-flops 1044, 1046, 1048, and 1050.

The settings of the adders are clocked into the flip-flops 1044, 1046, 1048, and 1050 as each character of an entry, either a data entry or an estimate number entry, is supplied by the output steering circuit 1118 during an output recording cycle. More specifically, the gate 954 (FIG. 9) in the output control circuit 116 provides a pulse or output signal DR immediately preceding each advance of the counting circuit 968. This signal DR is applied to the input of a monostable time signal generating circuit 1002 (FIG. 10) to provide a positive-going signal at its output of around 10 milliseconds duration. This signal is applied to one input of the gate 1034. The remaining two inputs to the gate 1034 are normally enabled by the inverted signals $\overline{*FF}$ and $\overline{CHE}$. Accordingly, the timing signals from the generator 1002 are repeated through the gate 1034 and the inverter 1036 to clock the settings of the adders into the flip-flops 1044, 1046, 1048, and 1050 incident to the recording of each character during an output recording scan. When the flip-flop 980 (FIG. 9) in the output control circuit 116 is set at the end of each scan, the signal $\overline{*FF}$ momentarily drops to a low level to inhibit the gate 1034 from following the last in the series of signals DR. Accordingly, the flip-flops 1044, 1046, 1048 and 1050 provide four output signals HS1, HS2, HS4, and HS8 that is the checksum total of all of the intelligence or binary weighted bits supplied to the output recorder 102 during all of the entries made incident to a given estimate.

As indicated above, the automatic recording to the end-of-block entry and the clearing of the system 100 is initiated by momentarily actuating the cue switch 108 which is back lighted by the lamp 928 (FIG. 9) to provide legend "END." This momentarily closes a pair of contacts 208A so that a NAND gate 910 is momentarily inhibited to trigger a monostable timing circuit 912. The circuit 912 delivers a positive-going pulse to one input of a NAND gate 914, the other input of which is supplied with an enabling potential if a resetting or recording operation is not being performed (gate 944), and the cue switch flip-flop 920 has been reset so that the signal $\overline{QFF}$ applied to the gate 940 is at a positive level.

The output of the gate 914 supplies a negative-going cue signal $\overline{CO}$ and drives an inverter 916 to provide a positive-going cue signal CO. Since the end-of-block recording cycle of a short cycle including only the positions defined by the steering out signals SE8-SE15, the signal CO completes the enabling of the gate 974, the other input of which is enabled by the signal $\overline{QFF}$. The more negative output from the NAND gate 974 provides a signal $\overline{COQ}$ and it effective through the gate 976 and the inverter 978 to prime the fourth counting stage in the counter 968 to its set condition so that the decoding circuit 970 provides a more positive steering signal SE8.

The inverted cue switch signal $\overline{CO}$ controls the timing circuit 902 in the same manner as the signal $\overline{EO}$ to provide the signal EOC which inhibits the inputs from the cue switch 208 and the enter switch 210. The signal $\overline{COQ}$ developed at the output of the gate 974 also sets the flip-flop 950 so that the signal EFF rises to a more positive level.

The trailing edge of the signal $\overline{CO}$ which is applied to one input of the gate 918 sets the cue switch flip-flop 920 and the checksum flip-flop 922. The setting of the flip-flop 920 applies the inhibits described above to prevent the system from being used without the entry of an estimate number, terminates the illumination of the lamp 928, and illuminates the lamp 932 so that the legend "ESTIMATE 0" on the key 208 (FIG. 2) is back lighted.

The setting of the flip-flop 922 provides a more positive signal CHE and a lower level signal $\overline{CHE}$. The signal $\overline{CHE}$ inhibits the gate 1034 (FIG. 10) so that the settings of the flip-flops 1044, 1046, 1048, and 1050 in the checksum circuit 1000 cannot be changed. The signal CHE partially enables the gate 1038 for resetting the checksum circuit 1000. The low level signal $\overline{CHE}$ inhibits the four gates 1122 in the output steering circuit 118 (FIG. 11) so that the storage register 112 does not control the gate arrays 1100–1103 in the position in the scanning sequence defined by the signal SE15. The more positive signal CHE enables the four gates 1123 supplied with the checksum output signals HS1, HS2, HS4, and HS8 to permit the checksum character to be recorded in the position defined by the last steering out signal SE15. The more positive signal CHE also completes the enabling of the gate 1126 so that an end-of-block flag is recorded in the third channel of the tape in the position in the scanning sequence defined by the steering out signal SE8.

Since this SE8 signal is now positive because the output counter 968 was primed to this position in the manner described above, the gate 1102 is conditioned to record the end-of-block flag when the output strobe signal OSF is provided. The generation of this signal OSF is initiated by the signal $\overline{COQ}$ which was developed at the output of the gate 974 by the signal CO from the cue timing circuit 912. The signal $\overline{COQ}$ controls and the gate 954 to provide an input to the timing circuit 956. Thus, the timing circuits 956 and 962 provide strobe signals and operating signals for the counting circuit 968 in the manner described above. In the positions defined by the signals SE9–SE14, only the punch controls 1114 and 1115 are effective to record in the fifth and seventh channels of the tape. When the signal SE15 is provided, the value of the checksum is transferred from the checksum circuit 1000 to the tape of the output recorder 102.

The output control circuit 116 then returns to its normal condition by setting and resetting the flip-flop 980 and by resetting the flip-flop 950. When the flip-flop 980 is set at the end of the recording cycle, the gate 1038 (FIG. 10) in the checksum circuit is fully enabled, and its low level output is effective through the gate 1040 and the inverter 1042 to reset the flip-flops 1044, 1046, 1048, and 1050. This resetting signal is removed from the flip-flop 980 is reset incident to clearing the output control circuit 116.

Thus, at the end of the recording cycle, the output control circuit 116 is restored to its normal condition in which it is placed when the system 100 is first placed in operation for the actuation of the on-off switch 202. I7 this state, the cue switch 920 is set to inhibit operation of the system until the estimate number is entered through the keyboard 108 as the firstt item relating to the next estimate. However, the checksum flip-flop 922 remains set until the enter key 210 is operated incident to the entry of estimate number. Since the cue switch 920 is set, the signal $\overline{EOQ}$ applied to the gate 918 as a result of actuation of the enter switch 210 not only resets the cue flip-flop 920 as described above, but also resets the checksum flip-flop 922. The flip-flop 922 remains in this reset condition until the cue switch 208 is next operated in the manner described above.

Although the present invention is described with reference to a single illustrative embodiment thereof, it should be understood that numerous other modifications and embodiments of the invention can be devised by those skilled in the art that will fall within the spirit and scope of the principles of this invention.

What is claimed and desired to be secured by Letters Patent of the United States is:

1. A data collecting system for recording in code data derived from and related to graphic records, comprising:
- a recorder,
- a storage register for storing a quantity and coupled to the recorder for controlling its operation,
- a detecting means movable relative to a graphic record and operable to supply signals representing a quantity,
- a control circuit operable to a first setting for applying the signals form the detecting mans to the storage register to increase the quantity in the storage register and operable to a second setting to decrease the quantity in the storage register.

2. The data collecting system set forth in claim 1 in which:
- the control circuit is normally in said first setting and includes manually operable means for placing said control circuit in said second setting.

3. The data collecting system set forth in claim 1 in which:
- the control circuit includes means controlled by the value of the quantity stored in the storage register for changing the control circuit between its first and second settings.

4. A data collecting system for recoding in code data derived from and related to graphic records, comprising:
- a recorder,
- a storage register for storing a quantity and coupled to the recorder for controlling its operation, said storage register including a bidirectional counter,
- detecting means movable relative to the graphic record and operable to provide signals representing a quantity,
- a control circuit coupled to the storage register and operable to control both the direction of operation of the bidirectional counter and the operation of the counter in the selected direction by said signals,
- and manually operable means coupled to the control circuit and operable to different settings to control the selection of the direction of operation of the bidirectional counter.

5. The data collecting system set forth in claim 4 including:
- keyboard means for supplying keyboard signals for entering a quantity into said storage register,
- and control means coupled to the control circuit for controlling the control circuit to select the direction of operation of the bidirectional counter independent of the setting of the manually operable means and for supplying said keyboard signals to the counting circuit.

6. The data collecting system set forth in claim 4 in which:
- the detecting means includes both a plurality of separate detectors and selecting means for rendering different ones or combinations of the detectors effective to supply said signals.

7. A data collecting system for recording in code data derived from and related to graphic records, comprising:
- a recorder,
- a storage register for storing a quantity and coupled to the recorder for controlling its operation,
- a detecting means movable relative to a graphic record and operable to supply signals representing a quantity,
- manually operable keyboard means for supplying signals representing a quantity,
- a control circuit coupled to the detecting means, the keyboard means, and the storage register for coupling the signals from the detecting means and the keyboard mean to the storage register to selectively increase or decrease the quantity in the storage register on successive operations to provide a resultant quantity,
- and a manually operable record control means coupled to the recorder for placing the recorder in operation to record the resultant quantity in the storage register.

8. The data collecting system set forth in claim 7 including:
- a sign detecting circuit controlled by the storage register and operable to control the recorder to provide an indication of the positive or negative character of a resultant quantity recorded by the recorder.

9. A data collecting system for use with graphic records comprising:
- a storage register for storing a value,
- detecting means coupled to the storage register and movable relative to a graphic record for providing value representing signals for operating the storage register,
- a keyboard means for providing value representing signals,
- a keyboard register for storing in value representing signals from the keyboard means,
- a control circuit coupled to the keyboard register and the storage register for transferring a value form the keyboard register to the storage register, the storage register being operated to a resultant value in accordance with the value representing signals from either or both of the keyboard means and the detecting means,
- a sign detecting means controlled by the storage register means to represent the positive or negative sign of the resultant value, and recording means controlled by the storage register and the sign detecting means for recording the resultant value and its sign.

10. The data collecting system set forth in claim 9 including:
manually operable input means selectively operable to settings representing material identification,
and means controlled by said input means for recording the selected material identification in conjunction with each recorded value and sign.

11. The data collecting system set forth in claim 9 in which:
the storage register includes a bidirectional counter,
and direction controlling means are provided for controlling the direction of counting of the counter in accordance with the value representing signals.

12. The data collecting system set forth in claim 11 in which:
the keyboard register includes a plural stage countdown register supplied with a value by the keyboard means,
and a common clock pulse source is provided coupled to the countdown register and the bidirectional counter for operating the countdown register to decrement the value stored therein while the bidirectional counter is incrementally operated in its selected direction.

13. A data collecting system for use with graphic material having representations of different items therein comprising:
selecting means manually operable to select different ones of said items and to provide coded representations of the selected items,
a plurality of detecting means each independently moveable relative to the graphic material for supplying a quantity or value related to the items,
control means controlled by the selective operation of the selecting means for rendering different ones of the detecting means effective to supply a quantity of value in dependence on the item selected by the selecting means,
and a recorder controlled by the selecting means and the detecting means for recording the selected and coded item representation and the supplied quantity or value.

14. The data collecting system set forth in claim 13 including:
alarm means,
and means controlled by the control means for operating the alarm means when an attempt is made to supply a quantity or value using a detecting means that has not been enabled by the control means.

15. In a system for compiling and storing data relating to a graphic record:
recording means for storing digital data,
storage means for storing data,
output control means for coupling the storage means to the recording means to transfer data from the storage means to the recoding means,
a plurality of detecting means movable relative to the graphic record and each operable to supply data to the storage means,
a plurality of manually operable selectors each adapted to supply data to the output control for transfer to the recoding means to identify the data to be stored in the storage means,
and inhibiting means coupled to the plurality of detecting means and controlled by the selectors for rendering different ones of the detecting means effective to supply data to the storage means in accordance with the operated one of the selectors.

16. The system set forth in claim 15 including:
at least one visual display means operable to provide a plurality of different visual displays,
and means controlled by the selectors in accordance with the operated selector for controlling the visual display means to provide a given one of the different visual displays.

17. The system set forth in claim 16 in which:
the visual display means includes an elongated web moveable in the direction of its elongation and motor means for moving the elongated web to a position determined by the operated selector.

18. A system for compiling data from a graphic recording comprising:
a recorder for storing data in coded form;
a keyboard unit for manually entering digital data,
detecting means movable relative to the graphic record for entering input data,
storage means for storing digital data,
input control means coupled to the keyboard unit, the detecting means, and the storage means for transferring data from the keyboard unit and the detecting means into the storage unit,
output control means coupled between the storage means and the recorder for transferring data from the storage means to the recorder,
and programming means coupled to the input and output control means for inhibiting the transfer of data to the recorder derived from the detecting means until at least one entry derived from the keyboard has been transferred to the recorder.

19. The system set forth in claim 18 including:
a plurality of said detecting means each adapted to supply input data,
a number of different manually operable selectors for supplying data to the recorder through the output control means identifying the data supplied by the detecting means,
and inhibiting means controlled by the selectors for selectively rendering different ones or combinations of the detecting means operable to supply data in accordance with the operated one of the selectors.

20. A data collecting system for use with graphic material having item representations therein comprising:
first selector means operable to select one of a number of broad classes of items and to provide a representation thereof,
at least one second selector means operable to select identifying data from one of a number of groups of such data and to provide corresponding identifying data representations, each group of data being related to one of said broad classes,
at least one elongated loop of web material bearing thereon a number of groups of legends, each group of legends corresponding to one of said groups of data,
legend display means disposed adjacent the second selector means,
drive means for moving the loop relative to the legend display means in either of two opposite directions,
control means coupled to the drive means and controlled by the first selector means for operating the drive means to move the legends corresponding to the selected class of items to the legend display means by operating the drive means in the direction resulting in the shortest movement of the loop,
and recording means controlled by the first and second selectors for recording the representation of the selected class and identifying data.

21. A data collecting system for use with scaled graphic illustrations comprising:
register mean including a signal responsive counter,
detecting means movable relative to the illustration and operable to supply a signal for use unit of relative movement between the detecting means and the illustration,
a scale selector operable to a plurality of different scale settings,
a control circuit supplied with the signals from the detecting means and controlled by the scale selector for supplying the counter with a number of operating signals corresponding to the true length represented by the relative movement between the detecting means and the illustration, said control circuit including signal multiplying means for generating a selected number of signals for each signal received from the detecting means when the selected scale has a unity ratio and signal dividing means supplied with the signals from the multiplying means and providing the counter operating signals when the selected scale is not a unity ratio.